United States Patent
Whitford et al.

(10) Patent No.: US 10,502,455 B2
(45) Date of Patent: Dec. 10, 2019

(54) SYSTEM AND METHOD TO REDUCE STANDBY ENERGY LOSS IN A GAS BURNING APPLIANCE AND COMPONENTS FOR USE THEREWITH

(75) Inventors: Geoffrey Mervyn Whitford, Sydney (AU); Brendon John Ruwoldt, Sydney (AU); Juraj Gacsay, Kellyville (AU)

(73) Assignee: Invensys Controls Australia Pty Ltd., Pendle Hill, NSW (AU)

( * ) Notice: Subject to any disclaimer, the term of this patent is extended or adjusted under 35 U.S.C. 154(b) by 3011 days.

(21) Appl. No.: 12/687,159

(22) Filed: Jan. 14, 2010

(65) Prior Publication Data
US 2011/0168284 A1  Jul. 14, 2011

(51) Int. Cl.
*F16K 1/16* (2006.01)
*F24H 9/20* (2006.01)
(Continued)

(52) U.S. Cl.
CPC .......... *F24H 9/2035* (2013.01); *F16K 1/221* (2013.01); *F16K 1/443* (2013.01); *F16K 31/122* (2013.01); *F23L 11/005* (2013.01); *F23L 13/02* (2013.01); *F23N 3/042* (2013.01); *F24H 1/205* (2013.01); *F24H 9/0026* (2013.01); *F24H 9/0031* (2013.01); *F23N 2025/22* (2013.01);
(Continued)

(58) Field of Classification Search
USPC ............. 137/613; 251/301, 337, 331, 335.2; 126/351; 431/44, 46, 49, 50
See application file for complete search history.

(56) References Cited

U.S. PATENT DOCUMENTS

| | | |
|---|---|---|
| 1,813,395 A | 7/1931 | Fraser |
| 1,842,337 A | 1/1932 | Te Pas |

(Continued)

FOREIGN PATENT DOCUMENTS

| | | |
|---|---|---|
| CA | 2409271 A1 | 4/2003 |
| CA | 2426723 A1 | 7/2003 |

(Continued)

OTHER PUBLICATIONS

S. K. Sarkar, Flame traps—a technical note, journal, Jul. 1987, 5 pages, pp. 323-327, Journal of Mines, Metals & Fuels.

(Continued)

*Primary Examiner* — Steven B McAllister
*Assistant Examiner* — John E Bargero
(74) *Attorney, Agent, or Firm* — Reinhart Boerner Van Deuren P.C.

(57) ABSTRACT

A system to reduce standby losses in a hot water heater is presented. The system utilizes a dual safety relay valve between the combination gas controller and the burner. The dual safety relay valve bypasses gas to a rotary damper actuator valve to position a damper flapper valve located over/inside the flue pipe. Once the flapper valve has opened to ensure combustion, the gas is allowed to flow back to the dual safety relay valve. Some of the bypass gas may be diverted to boost the pilot or to supply a booster. The dual safety relay valve is then opened to allow the gas supply to the burner. Once the burner is turned off, bypass gas bleeds out of the rotary damper actuator valve to close the damper flapper valve to reduce standby losses through the flue pipe, and to allow the dual safety relay valve to close tightly.

2 Claims, 18 Drawing Sheets

(51) Int. Cl.

| | | |
|---|---|---|
| *F16K 1/22* | (2006.01) | |
| *F16K 1/44* | (2006.01) | |
| *F16K 31/122* | (2006.01) | |
| *F23L 11/00* | (2006.01) | |
| *F24H 1/20* | (2006.01) | |
| *F24H 9/00* | (2006.01) | |
| *F23L 13/02* | (2006.01) | |
| *F23N 3/04* | (2006.01) | |

(52) U.S. Cl.
CPC ...... *F23N 2035/18* (2013.01); *F23N 2035/20* (2013.01); *Y10T 137/87917* (2015.04)

(56) References Cited

U.S. PATENT DOCUMENTS

| | | | |
|---|---|---|---|
| 1,959,970 A | | 5/1934 | Stinson |
| 1,968,319 A | | 7/1934 | Shively |
| 1,982,031 A | | 11/1934 | Stark |
| 2,241,661 A | | 5/1941 | Furlong |
| 2,953,198 A | | 9/1960 | Hajny |
| 3,166,248 A | | 1/1965 | Fleer |
| 3,405,999 A | | 10/1968 | Riehl |
| 3,693,653 A | * | 9/1972 | Cramer et al. ............... 137/557 |
| 4,076,171 A | | 2/1978 | Swenson |
| 4,131,413 A | | 12/1978 | Ryno |
| 4,164,936 A | | 8/1979 | Dottore, Jr. |
| 4,182,483 A | | 1/1980 | Swenson |
| 4,192,310 A | | 3/1980 | Brodin |
| 4,204,833 A | | 5/1980 | Kmetz et al. |
| 4,225,080 A | | 9/1980 | Barth |
| 4,249,883 A | | 2/1981 | Woolfolk |
| 4,264,296 A | | 4/1981 | Folkerts |
| 4,266,929 A | | 5/1981 | Swenson |
| 4,267,820 A | * | 5/1981 | Charron ................... 122/14.21 |
| 4,289,271 A | | 9/1981 | Barth |
| RE30,936 E | | 5/1982 | Kmetz et al. |
| 4,386,731 A | | 6/1983 | Barth |
| 4,408,567 A | | 10/1983 | Morton |
| 4,413,975 A | | 11/1983 | Turner et al. |
| 4,424,830 A | | 1/1984 | Arnsperger et al. |
| 4,430,989 A | * | 2/1984 | Narang et al. ............ 126/273 R |
| 4,543,974 A | * | 10/1985 | Dietiker et al. .............. 137/66 |
| 4,622,999 A | * | 11/1986 | Ray .......................... 137/601.01 |
| 4,770,160 A | | 9/1988 | Schimmeyer |
| 4,778,378 A | | 10/1988 | Dolnick et al. |
| 5,039,006 A | | 8/1991 | Habegger |
| 5,239,947 A | | 8/1993 | Schimmeyer |
| 5,393,221 A | | 2/1995 | McNally |
| 5,447,125 A | | 9/1995 | McNally et al. |
| 5,682,841 A | | 11/1997 | Schimmeyer et al. |
| 5,732,692 A | | 3/1998 | Schimmeyer |
| 5,911,217 A | | 6/1999 | Dameworth |
| 6,418,883 B2 | | 7/2002 | Bourke et al. |
| 6,546,897 B1 | | 4/2003 | Edds et al. |
| 6,584,940 B1 | | 7/2003 | Khadkikar et al. |
| 7,222,639 B2 | * | 5/2007 | Bonne et al. ................ 137/613 |
| 7,311,064 B2 | | 12/2007 | Schimmeyer |
| 2004/0200530 A1 | * | 10/2004 | Dalton et al. ................ 137/489 |
| 2005/0066958 A1 | | 3/2005 | Guzorek |
| 2006/0207654 A1 | * | 9/2006 | Huang ............................ 137/66 |
| 2010/0012048 A1 | | 1/2010 | Whitford et al. |
| 2010/0015559 A1 | | 1/2010 | Whitford et al. |

FOREIGN PATENT DOCUMENTS

| | | | | |
|---|---|---|---|---|
| CA | 2482509 A1 | | 3/2005 | |
| EP | 0019671 A1 | | 5/1979 | |
| GB | 528827 | | 11/1940 | |
| GB | 942650 | | 11/1963 | |
| GB | 953982 | | 4/1964 | |
| GB | 1059306 | | 2/1967 | |
| GB | 1 475 133 | | 6/1977 | |
| GB | 2259968 A | * | 3/1993 | ............... F16K 1/44 |
| JP | 56119420 | | 9/1981 | |
| JP | 57188950 | | 11/1982 | |
| JP | 58033050 | | 2/1983 | |
| JP | 59157422 | | 9/1984 | |
| JP | 60-226623 | | 11/1985 | |
| JP | 62063140 | | 3/1987 | |
| JP | 63021404 | | 1/1988 | |
| JP | 4045320 | | 2/1992 | |
| JP | 2007232262 | | 9/2007 | |
| WO | WO 95/17631 A1 | | 6/1995 | |
| WO | WO 00/40906 A2 | | 7/2000 | |
| WO | WO 2006/135319 A1 | | 12/2006 | |

OTHER PUBLICATIONS

J. A. Harris et al., Flame stability—principles and practice, journal, Mar. 10, 1978, 22 pages, London and Southern Junior Gas Association.

Ken Lapp et al., Detonation Flame Arrester Qualifying Application Parameter for Explosion Prevention in Vapor Handling Systems, paper, Apr. 1995, 8 pages, pp. 139-146, Process Safety Progress (vol. 14, No. 2), Westech Industrial Ltd., 5636 Burbank Crescent , S.E., Calgary, Alberta, Canada T2H 1Z6.

R. P. Wilson et al., Flame Arrestor Design Requirements for Prolonged Exposure to Methane/Air, and Gasoline/Air Flames, report, Sep. 1978, 53 pages, Report No. CG-D-73-78, U.S. Department of Transportation, United States Coast Guard, Office of Research and Development, Washington, D.C. 20590.

U.S. Appl. No. 12/175,504, filed Jul. 18, 2008, Whitford et al.
U.S. Appl. No. 12/175,551, filed Jul. 18, 2008, Whitford et al.

* cited by examiner

SYSTEM AND METHOD TO REDUCE STANDBY ENERGY LOSS IN A GAS BURNING APPLIANCE AND COMPONENTS FOR USE THEREWITH

FIELD OF THE INVENTION

This invention generally relates to energy conservation systems, and more particularly to energy conservation systems to be employed with gas burning appliances to reduce standby losses associated therewith.

BACKGROUND OF THE INVENTION

It has now been recognized that the world's environment is suffering too much from problems caused by global climate change and greenhouse gas exposure in the atmosphere. To address this problem governments are now starting to adopt targets for reducing the emission of greenhouse gases to the environment and play their part to address this problem for future generations. While some countries have not adopted a firm goal, other countries, for example Australia, have adopted a policy for reducing greenhouse gases by 20% by the year 2020.

Greenhouse gases can be emitted from cars, industry, farming, and households to name a few. While certainly not as apparent as a large factory with tall smokestacks, within a normal household the gas burning appliances, such as furnaces, water heaters, etc., all release such greenhouse gases as a by-product of the combustion process itself. While the appliance industry has taken a leading role in energy efficiency and environmental concern, further improvement is always foremost in mind of the appliance design engineer.

With such further improvement in mind, especially with the increased awareness of global climate change and changing governmental regulations, it is noted that hot water heaters, both internal and externally installed units, can be one of the more fairly inefficient appliances in energy conservation, and therefore require the burning of additional fuel to maintain the set point temperature. This, of course, results in the additional production of greenhouse gas beyond that which a more efficient appliance would produce.

A typical hot water heater includes a vertical tank with a centrally located flue pipe. A gas burner is positioned underneath the tank and is controlled by a combination gas controller. The combination gas controller incorporates an On/Off valve, a pilot safety circuit, pilot and main burner pressure regulators and their associated supply pipe connections, as well as a thermostat to control the hot water heater to maintain the water in the storage tank at a predetermined temperature.

Upon the thermostat calling for more heat, the main gas valve opens to allow gaseous fuel (gas) to flow to the main burner where it is ignited by the pilot light. Ignition and combustion of the gas results in hot flue gas being generated. The heat from the hot flue gases is transferred to the cold water via the bottom of the tank and through the walls of the central flue pipe. The flue gases exit out the top of the hot water heater.

There are generally two types of hot water heaters used throughout the world classified by their installation location. For an indoor water heater such as used in the North American market, the hot flue gases exit through a draft diverter that is connected to a flue pipe which pipes the flue gases safety to an outside location. Air for combustion of the gas is drawn into the combustion chamber at the bottom of the hot water heater. For an outdoor hot water heater such as used in the Australian market, the flue gases pass safely through a balanced flue terminal at the top of the heater to the outside atmosphere. The balanced flue terminal is so designed to allow a continuous supply of air for combustion irrespective whether the burner is on or off under all types of wind conditions. The air for combustion is transferred to the bottom of the heater internally within the appliance.

One of the current disadvantages for hot water heaters is the overall service efficiency of the appliances. Service efficiency is defined as the energy delivered to the hot water from the hot water heater each day, divided by the energy burnt in the gas to heat the water and to maintain the hot water in the tank at the desired temperature. The service efficiency may vary from around 0.50 or 50% for poor performing appliances, to appliances just complying to US regulations around 0.59, to superior products from 0.64 or 64% service efficiency. Low service efficiency may be due to poor thermal efficiency of the heat into the water when the burner is on and/or excessive heat losses when the burner is off.

While a small percentage of the heat loss may be caused by poor insulation from the outside of the tank, the majority of the losses are more likely a result of excessive losses from the hot primary flue pipe (heat exchanger) in the middle of the heater. This pipe is in contact with the hot water in the tank, and is designed to provide excellent heat transfer with the water to improve the "heat in" efficiency.

However, just as heat is transferred into the water when the burner is on, heat is also transferred out of the water when the burner is off. As a result of this standby heat loss, relatively cold air is continually being heated up and flows out of the hot water heater due to a thermo-syphoning effect by the flue pipe when the burner is off. Since the main burner is only on for one to two hours per day heating the stored water to keep it ready for use, the surfaces inside the flue pipe are exposed to the relatively cooler air for the remaining 22 hours. This natural cooling of the heated water via the flue pipe forces the thermostat to occasionally turn on the burner to continually top up the stored hot water to the desired temperature.

Recognizing this standby heat loss problem, there have been many attempts at providing some form of a flue damper that closes to limit the escape of heat through the flue pipe when the burner is turned off and that reliably opens to let the flue gases escape when the burner is on. Indeed, laboratory tests have proven that dampers can reduce the standby losses of a hot water heater by up to approx. 50%. This relates to approx. 500 Btu/h (0.50 Mj/h), which is a huge amount of energy considering the product life to 10 to 15 years. While such a damper could be electrically powered, such a damper would require additional power use and would need to be driven by a reliable supply. Gas powered dampers, that is dampers driven by the gas used for combustion, alleviate the problems of additional electrical power use and reliable supply. Unfortunately, the appliance industry generally and hot water heater manufacturers specifically have been frustrated by the fact that gas operated dampers "nearly work". They are not popular and commonly have many problems and service issues.

One significant problem experienced by gas operated flue dampers relates to candling of the diminishing flame on shut down of conventional burners and low NOx burners. This candling effect results from the draining of the gas in the burner feed pipe that leads from the damper actuator valve to the burner after the burner has been commanded off. Since the gas operated damper valve is located on the flue pipe at the top of the hot water heater and the burner is located at the bottom, the gas pipe from the valve to the burner runs at least the length of the storage tank. As a result of the existence of gas in the pipe after the valve have been shut, a small flame at the injector continues to burn until the pipe is drained, which results in the gradual build up of soot in the burner. This, in turn, often results in poor combustion, further increasing the production of greenhouse and other dangerous gasses. Candling is especially a problem with installations where the gaseous fuel used is heavier than air such as propane, butane gas, etc.

To address the systemic problem of candling with prior gas operated dampers, some designs incorporate an additional damper valve bleed line, a flow orifice member, and a separate vent pilot. Unfortunately, such additional plumbing and components increase the complexity and cost of such systems, as well as reducing the overall reliability of the system due to the increase in components. In the highly cost competitive appliance industry, even with the overall lifetime cost of operation reduction and with the reduction in production of greenhouse gasses, such additional expense makes such hot water heaters undesirable by consumers.

Another problem with some gas controlled damper valves is that they can trap gas within the valving damper system. This often results in allowing the damper only partially to close the damper, reducing the energy savings by allowing some flow therethrough.

To address such problems existing in the art, the inventors of the instant application invented a new and improved standby heat loss control system as described in co-pending application Ser. No. 12/175,551, entitled System and Method to Reduce Standby Energy Loss in a Gas Burning Appliance, filed on Jul. 18, 2008, and assigned to the assignee of the instant application, the teachings and disclosure of which are hereby incorporated in their entireties by reference thereto. More specifically, such system provides a gas operated damper system for a hot water heater to enable hot water heaters to operate more efficiently thus reducing greenhouse gases. The system advantageously reduces the standby heat losses that occur as a result of thermo-syphoning of the heat from the hot water in the storage tank of a hot water heater by the flue pipe when the burner is off.

While this prior system provides significant advantages and advancements in energy savings, continued improvements in operating efficiency, safety, and cost reduction are desired. Embodiments of the present invention provide such improvements in an energy savings damper system. These and other advantages of the invention, as well as additional inventive features, will be apparent from the description of the invention provided herein.

BRIEF SUMMARY OF THE INVENTION

In view of the above, embodiments of the present invention provide a new and improved standby heat loss control system that overcomes one or more of the problems exiting in the art and provides improvements over the inventors' prior system. More specifically, embodiments of the present invention provide a new and improved gas operated damper system for a hot water heater to enable hot water heaters to operate more efficiently thus reducing greenhouse gases. Preferably, embodiments of the present invention provide a new and improved gas operated damper that reduces the standby heat losses that occur as a result of thermo-syphoning of the heat from the hot water in the storage tank of a hot water heater by the flue pipe when the burner is off.

In particular, embodiments of the present invention provide a rotary damper actuator valve and dual safety relay valve downstream of the combination gas controller. Both valves are operated in series by the use of bleed gas supplied by the combination gas controller. The bleed gas pressure operates the appliance damper actuator system in a controlled and defined safe manner, then supplies gas to operate the dual safety relay valve.

In one embodiment, the dual safety relay valve is configured to bypass a small amount of gaseous fuel to the rotary damper actuator valve when the thermostat in the combination gas controller calls for heat. The bleed gas flows to the rotary damper actuator valve and causes operation of the damper via a damper flapper valve to open the flue pipe. When the damper is open, and only then, the rotary damper actuator valve, via a damper actuator safety valve, allows the bleed gas to be piped back down to the dual safety relay valve to actuate it, opening it and allowing gas to flow to the main burner of the hot water heater.

In one of the preferred embodiments, the system automatically opens and closes the rotary damper actuator valve, its associated mechanism and the dual safety relay valve in a defined and controlled manner. The valving is designed so that no gas can physically pass to the main burner if the rotary damper actuator valve and connected mechanisms have not moved open sufficiently for good combustion. In addition, the rotary damper actuator valve and connected mechanism automatically and safely close off the appliance's flue pipe (heat exchanger) from free ventilation immediately after the burner off cycle is completed.

The configuration of valves prevents gas from passing to the main burner until the piped bleed gas pressurizes a rotary damper actuator valve diaphragm, which in turn moves the diaphragm, piston, and rotates the corresponding linkage attached to the damper flapper valve at the outlet of the water heater flue pipe to open the damper flapper valve.

In one embodiment, the damper diaphragm and piston has an underside linkage to a damper actuator safety valve on the gas side. Continued diaphragm and piston movement after opening the damper finally drags a damper actuator safety valve from its seat, thereby allowing bleed gas to pass. This bleed gas then pressurizes the dual safety relay valve. Diaphragms in the dual safety relay valve are forced to move by this pressurizing bleed gas, which opens each of the series connected main relay valves to allow gas to flow to the main burner. The bleed gas, as it is continually being passed from the combination gas controller, through the rotary damper actuator valve, and back to the dual safety relay valve, is finally mixed into the main gas to the burner.

In one embodiment the dual safety relay valve includes two back to back valves manufactured 180 degrees to each other but on the same axis to provide an efficient compact design. The miniaturization provided by this orientation offers installation and cost advantages, allowing fitment under the existing gas controllers, e.g. under the existing thermostat on the burner feed pipe. This is an advantage for new heaters and also retrofit applications on existing installed heaters. Further, the dual construction ensures compliance with redundant safety standards and is cheaper to manufacture than two discrete relay valves. In an embodiment, the dual safety relay valve is designed to operate with small gas bleed systems for compatibility with ignition pilots, such as the system described in co-pending application Ser. No. 12/175,504, entitled Micro-Pilot for Gas Appliance, filed Jul. 18, 2008, and assigned to the assignee of the instant invention, the teachings and disclosure of which are hereby incorporated in their entireties by reference thereto.

In one embodiment the rotary damper actuator valve includes a damper actuator safety valve and linkage. The damper actuator safety valve in the rotary damper actuator valve is designed to open at a predetermined correct angular position of pressurization of the diaphragm. The pressurization movement rotates the shaft and opens the connected flapper valve sufficiently to ensure good combustion before allowing bleed gas to pass back to the dual safety relay. The design of the valve arm and linkage arm provides a good mechanical advantage to close the damper actuator safety valve tightly on its seat to stop any bypass of bleed gas when the damper flapper valve is in a closed position. The mechanical advantage generated by the linkage also allows more positive opening and closing of the damper flapper valve and improves safety under low gas pressures. The efficient design allows a smaller valve per given torque force generated than a conventional linear damper valve. Indeed, the rotating folding diaphragm provides more torque on the rotating shaft than other actuators. This shaft is attached to the damper flapper valve shaft. With more torque generated, the damper flapper valve shaft will overcome more opening friction in lifting the damper flapper valve off its seat compared with conventional linear valves. As such, the rotary actuator will therefore operate at lower gas pressures. It also gives the advantage that the damper flapper valve can be miniaturized. Due to these characteristic the design is smaller, more compact, requires less metal and therefore is cheaper.

In one embodiment of the damper flapper valve that is particularly well suited for use with outdoor square gas heaters, the design slips manufacturing tolerances by using the edge of the flapper valve seat as a floating fulcrum point. It allows for inexpensive sheet metal to be used rather that expensive die cast machined parts, and can be made for square of round ducting. In one embodiment there is incorporated an independent false flapper valve seat to close off tightly with the flapper. The design slips the manufacturing tolerances between tank flue pipe and the heater jacket.

In one embodiment of the damper flapper valve that is particularly well suited for use with indoor gas heaters, the damper flapper valve operating principle relies on an off-center axis weight distribution to automatically close the damper flapper valve should no external force be present. A hook shaped section at the end of the damper flapper actuator shaft, when it rotates due to pressurization, is used to force open the damper flapper valve by a weighting downward pressure on one side of the flapper valve. It creates this force as the hook hits the flapper valve during its rotation. The actual damper flapper valve is not preloaded when the burner is off as the shaft is not designed to contact the damper flapper valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
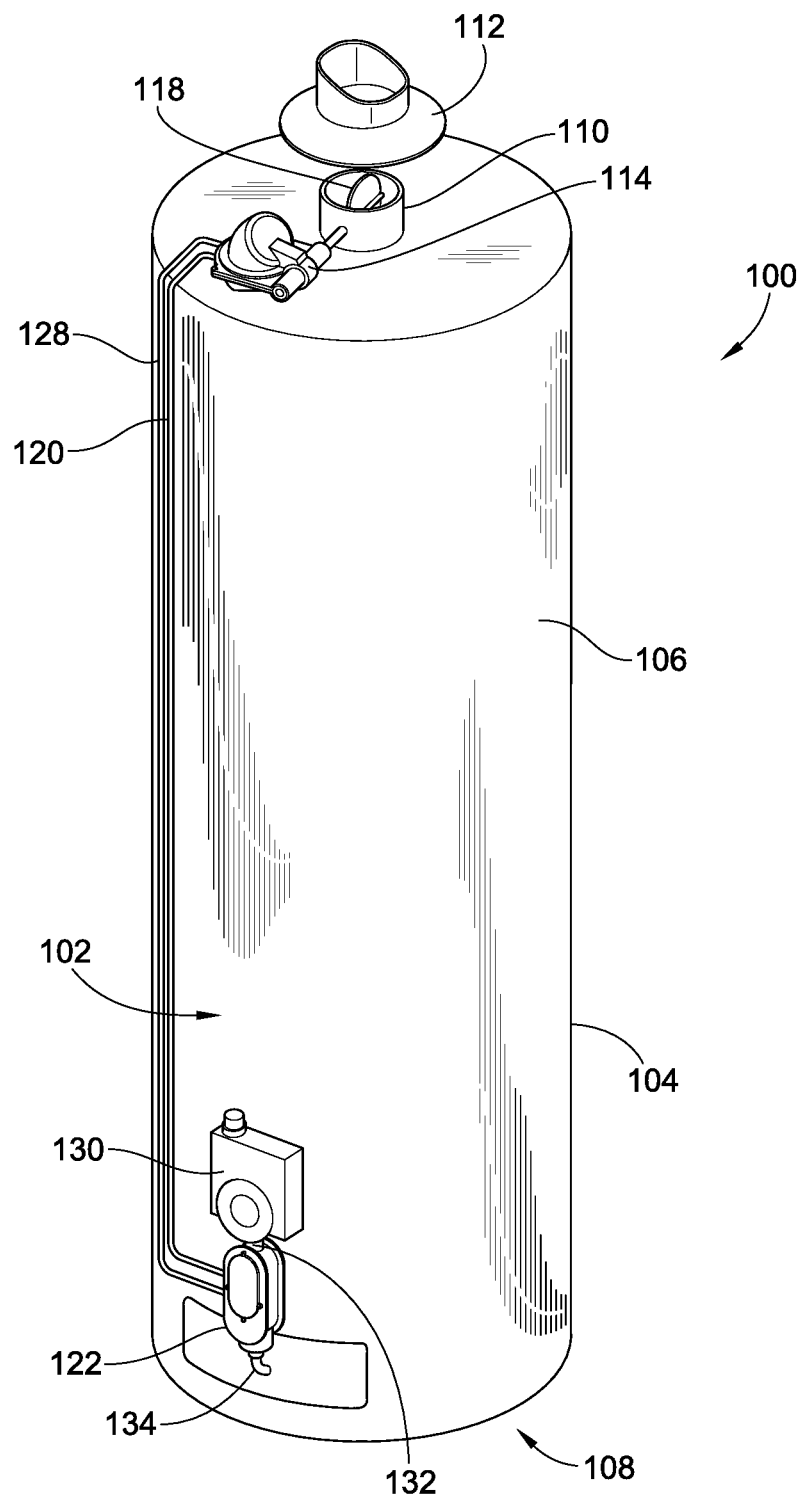
FIG. 1 is an isometric view of an indoor hot water heater having installed thereon an embodiment of the bypass gas operated standby heat loss prevention system of the present invention.

Turning now to the drawings, there is illustrated in FIG. 1 an indoor hot water heater 100 such as typically installed in dwellings in the North American market having installed thereon an embodiment of the standby heat loss control system 102 of the present invention. It should be noted that while the following description will discuss various embodiments of the present invention, such embodiments and operative environments to which these embodiments find particular applicability are provided by way of example and not by way of limitation. For example, the embodiment illustrated in FIG. 1 having the components of the standby heat loss control system 102 exposed, such as in a retrofit installation on an existing hot water heater 100, may instead in a different embodiment have one or more of such components and plumbing integrated into the combination gas controller 130 and/or housing 104 such that they are not visible to the consumer. Embodiments of the present invention may also find applicability in other gas burning appliances, e.g. a furnace, gas log, etc., which typically utilize a flue pipe to exhaust combustion gases during burner operation.

Returning specifically to FIG. 1, the hot water heater 100 includes a cylindrical storage tank 106 for storing the water to be heated by the burner (not shown) located in the bottom 108 of the hot water heater 100. The housing 104 around the storage tank 106 is typically in the form of an insulated round jacket to prevent heat loss though the exterior surface. The heat from the burner is exchanged with the water in the storage tank via the flue pipe 110 that leads from the burner through the storage tank 106 to a draft diverter 112 located on the top of the hot water heater 100. The draft diverter 112 is positioned to collect the hot flue gases from the flue pipe 110, and is coupled to a pipe that is positioned to carry these flue gasses out of the dwelling in which the hot water heater 100 is installed.

In this embodiment, standby heat loss is substantially reduced by the inclusion of a rotary damper actuator valve 114 that is located at the top of the hot water heater 100. The rotary damper actuator valve 114 is connected to a damper flapper valve 118 located on the flue pipe 110. This damper flapper valve 118 is used, as will be described more fully below, to close off the flue pipe 110 when the burner is off. The shape of the damper flapper valve 118 is normally round to close off the typical round flue pipe 110, although it would be square to close off square ducting, etc.

Figure 2:
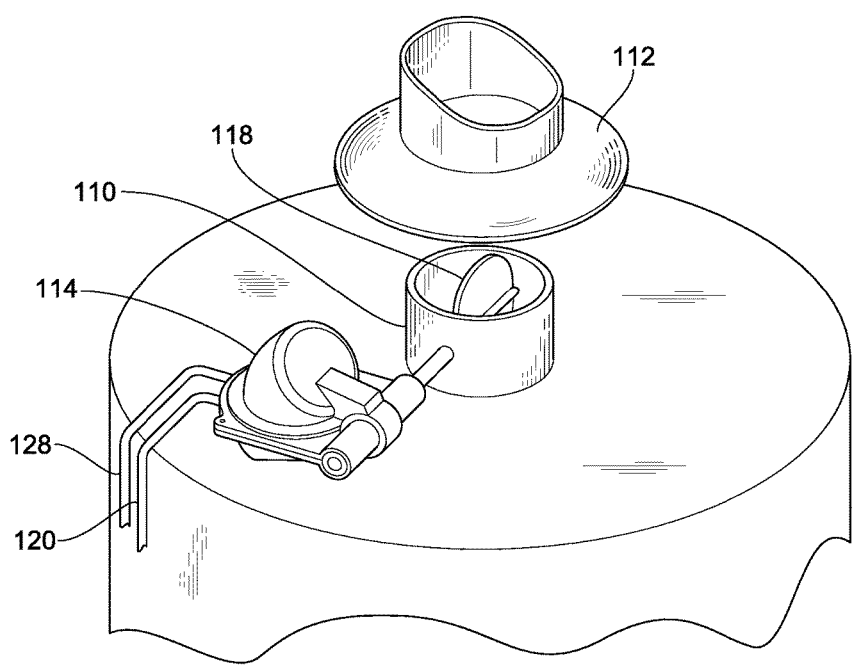
FIG. 2 is an enlarged partial section view of the hot water heater of FIG. 1 illustrating in greater detail the damper and rotary damper actuator valve.

As may be seen from the enlarged partial view of FIG. 2, the inlet 124 of the rotary damper actuator valve 114 is connected via small bore piping 120 to the inlet of the dual safety relay valve 122 (shown in FIG. 1). The outlet 126 of the rotary damper actuator valve 114 is also connected via small bore piping 128 back to the dual safety relay valve 122, the details of which will be discussed more fully below with regard to FIGS. 6 and 7.

Returning to the illustration of FIG. 1, it may be seen that the dual safety relay valve 122 is positioned between the hot water heater's combination gas controller 130 and the burner (not shown). Specifically, the outlet gas feed pipe 132 from the combination gas controller 130 is now connected to the dual safety relay valve 122, which in turn connected is to the burner feed pipe 134 which leads to the burner.

Although not recognized by prior gas operated damper designs, the dual safety relay valve 122 should be located immediately after the water heater combination gas controller 130 but as close as possible to the burner so to reduce the effect of pre-ignition and candling. Pre-ignition is defined as attempting to ignite the issued air/gas mixture from the burner ports too early (pressure within the burner head unstable) causing the explosive mixture to flash back through the burner ports and ignite within the burner head. Candling is defined as the draining of the gas in the burner feed pipe after the burner has been commanded off, so as to cause a small flame at the injector resulting in the gradual sooting up of the burner and bad combustion. This is especially a problem with gases heavier than air such as propane, butane gas.

Figure 3:
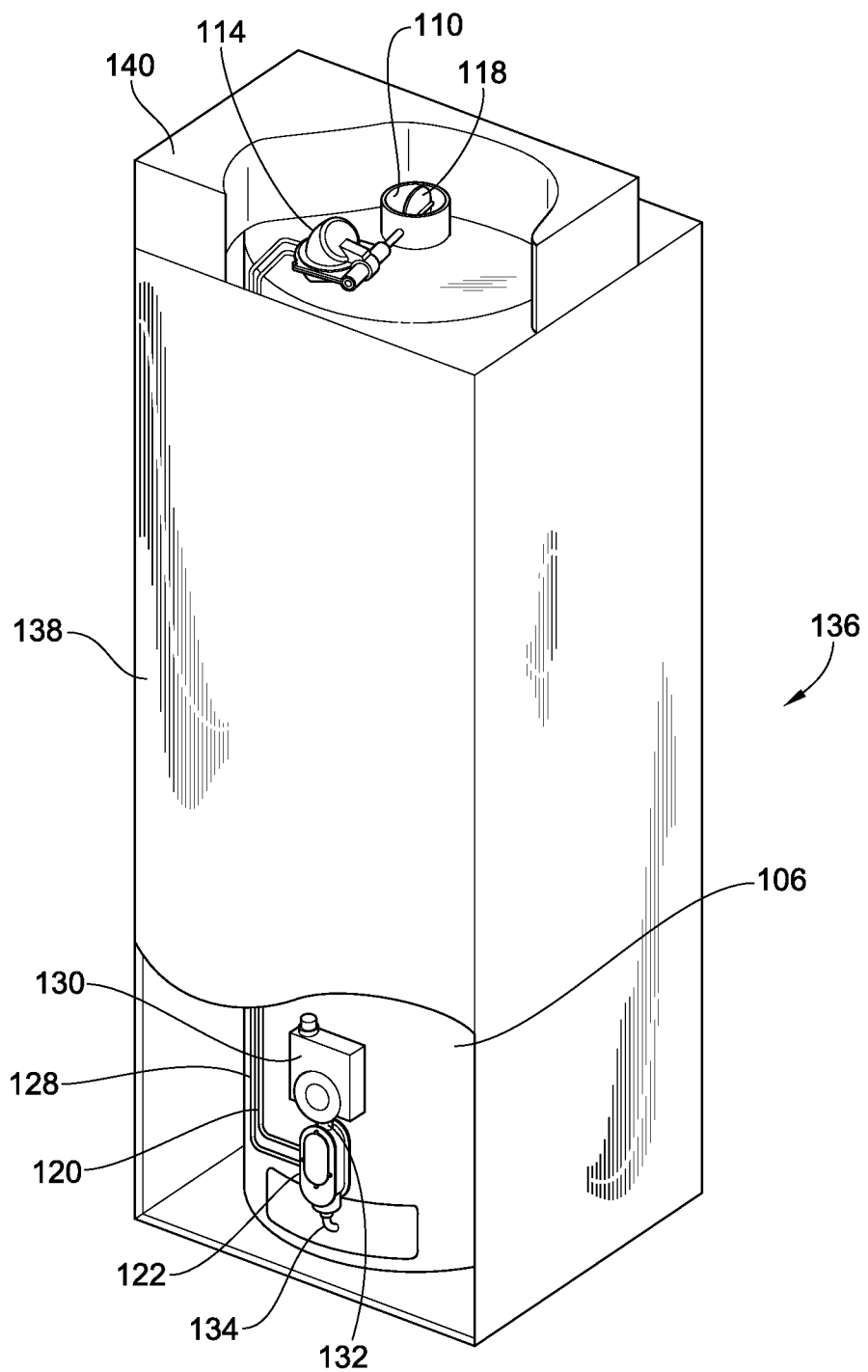
FIG. 3 is an isometric view of an square outdoor water heater having installed thereon on embodiment of the standby heat loss prevention system of the present invention showing the position of the rotary damper actuator valve and dual safety relay valve.

As discussed above, markets outside of North America, such as in Australia, install their hot water heaters outside of the dwellings. An embodiment of one such outdoor hot water heater 136 is illustrated in FIG. 3. The outdoor hot water heater 136 includes the cylindrical storage tank 106 housed in a rectangular jacket 138. A balanced flue terminal 140 is located on the top to collect the hot flue gases and disperse them from the front of the hot water heater 136.

The rotary damper actuator valve 114 is located inside the balanced flue terminal 140, attached to the outside of the transfer duct, which is adjacent to the heater flue pipe as it exits into the transfer duct (show in this illustration as 110 for ease of understanding). In this embodiment the rotary damper actuator valve 114 is located close to the cylinder flue pipe 110 outlet in order to reduce standing losses as discussed above. It may also be located either outside the terminal 140 away from the fresh air inlet or alternately be positioned in the terminal 140 but located so as not to create any turbulence under windy condition, e.g. in a static wind pocket within the terminal 140. In an alternate embodiment, to be discussed below with regard to FIGS. 15-20, the damper flapper valve 118 utilizes a valve seat bracket 210 configured for fitment into the balanced flue terminal 140 of the outdoor water heater 136 to ensure proper close off and venting therethrough.

Returning to the embodiment illustrated in FIG. 3, the damper flapper valve 118 to close off the flue pipe 110 is located immediately over the outlet of the flue pipe 110 inside the transfer duct and driven by the rotary damper actuator valve 114. Small bore piping 120, 128 is used to connect the dual safety relay valve 122 to the rotary damper actuator valve 114 as in the previous embodiment. The outlet gas feed pipe 132 from the combination gas controller 130 is now connected to the dual safety relay valve 122, which in turn is connected to the burner feed pipe 134 on supply gas to the burner. The tank 106 is insulated within the square jacket 138, which also provides internal pathways for the air to be transferred from the top terminal 140 to the burner at the bottom of the appliance.

Figure 4:
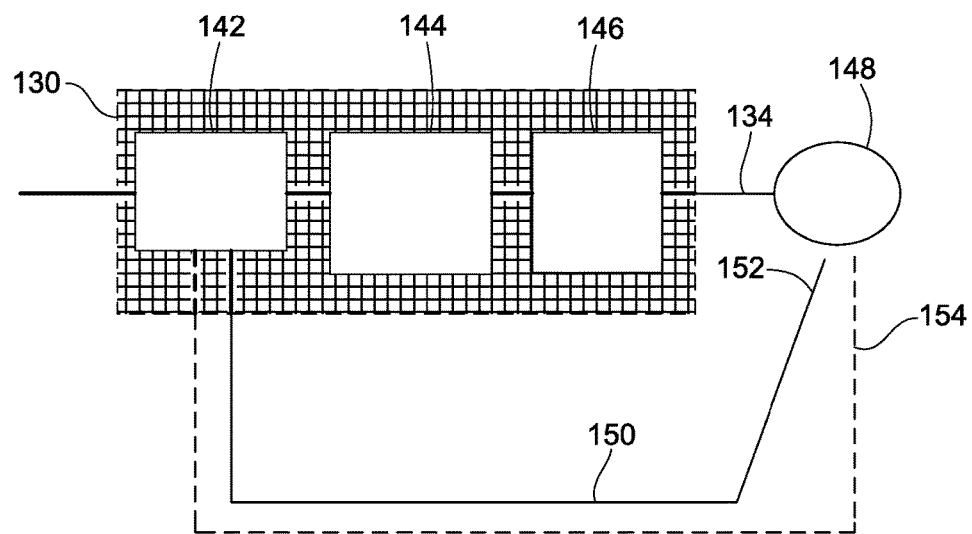
FIG. 4 is a block diagrammatic view of the primary functional activity components of the gas control system of a typical storage hot water heater.

To help understand the control provided by the various components of embodiments of the present invention, an understanding of a typical water heater combination gas controller 130 must first be had. To aid this, attention is now directed to the block diagram of FIG. 4, which illustrates the functional blocks of a standard hot water heater combination gas controller 130. The combination gas controller 130 incorporates in block 142 an off/pilot/on valve, pilot electro magnetic safety valve thermocouple system and a pilot regulator. The combination gas controller 130 also includes a thermostat 144 to control the gas to the burner 148 to heat up the water to a predetermined temperature, and a gas regulator 146 to regulate pressure to the main burner 148. To establish a safe pilot flame for burner ignition, functional block 142 supplies gas via a pilot feed pipe 150 to the pilot 152. A flame sensor 154, such as a thermocouple, is used to sense the presence of flame at the pilot 152 as a feedback to block 142.

Figure 5:
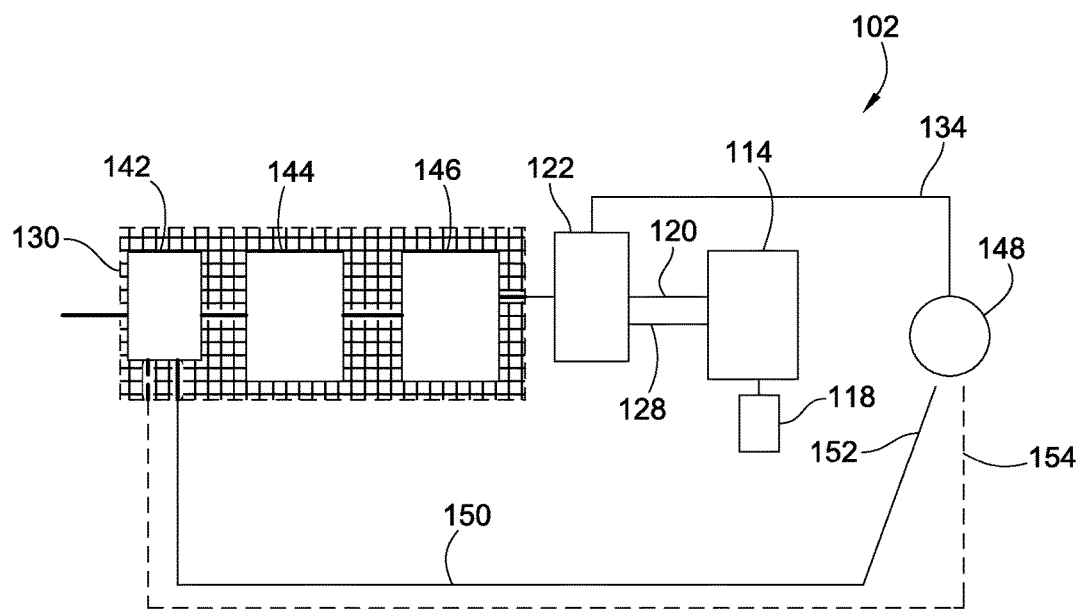
FIG. 5 is a block diagrammatic view of functional activity components of one embodiment of the gas control system of a storage hot water heater showing the additional components of the standby heat loss control system.

With this basic understanding in mind, attention is now directed to FIG. 5, which illustrates a simplified block diagram showing the functional connections between the combination gas controller 130 and components of one embodiment of the standby heat loss prevention system 102 of the present invention. It should be noted, however, that while this description and illustration show the dual safety relay valve 122 located outside of the housing of the combination gas controller 130, other embodiments of the present invention include the dual safety relay valve 122 within the same housing as the combination gas controller 130 (which refers to the functional elements and not the packaging thereof). As such, in the following description and claims, when the dual safety relay valve 122 is described as being installed between the combination gas controller 130 and the burner 148, this is a functional description and not a physical one, i.e. the dual safety relay valve 122 may be packaged within the same housing of the combination gas controller 130 or outside of the housing of the combination gas controller 130.

In either physical layout, the combination gas controller 130 remains unchanged in operation as discussed above. However, instead of having the gas regulator 146 coupled to the burner feed pipe 134, it is coupled to the dual safety relay valve 122, which is then coupled to the burner feed pipe 134. As discussed above, small bore pipe 120, 128 is used to couple the dual safety relay valve 122 to the rotary damper actuator valve 114 to drive the damper flapper valve 118. The advantage of using bleed gas to control the position of the damper flapper valve 118 and the operation of the dual safety relay valve 122, as opposed to using the main gas flow in prior designs, will be discussed more fully below once the details of an embodiment of the various components are better understood.

Figure 6:
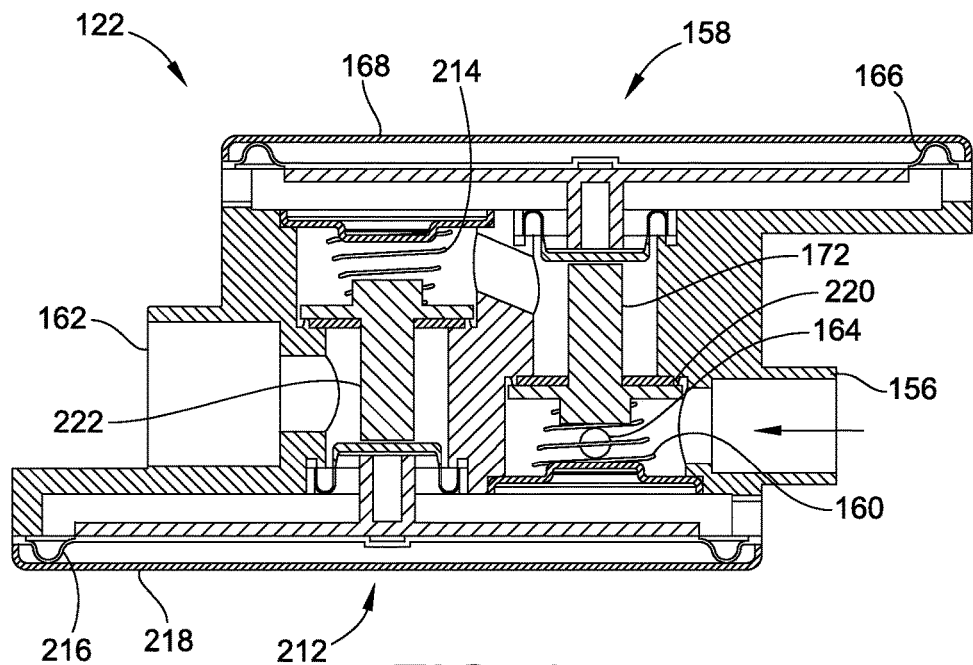
FIG. 6 is a diagrammatic cross section of a dual safety relay valve constructed in accordance with one embodiment of the present invention in a closed position.
Figure 7:
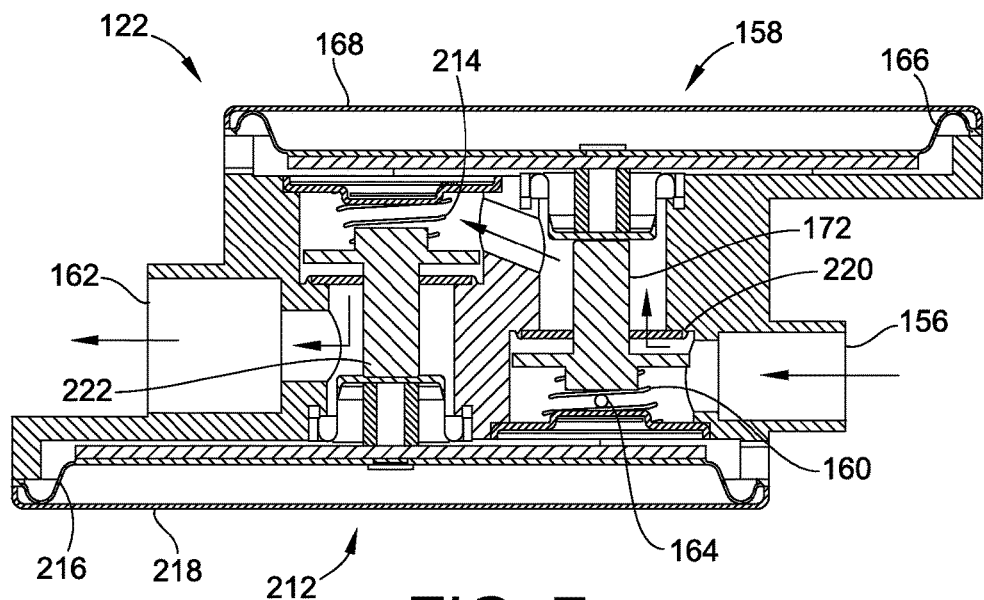
FIG. 7 is a diagrammatic cross section of the dual safety relay valve of FIG. 6 in an open position.

The details of one embodiment of a dual safety relay valve 122 are shown in the cross sectional illustrations of FIGS. 6 and 7. As may be seen, the dual safety relay valve 122 contains an inlet 156 to receive gas from the combination gas controller 130. A first main controlling valve 158 with a first valve return spring 160 and a secondary main controlling valve 212 with a second valve return spring 214 are positioned in series between the inlet 156 and the outlet 162. Preferably, the first and the second main controlling valves 158, 212 are included in a single housing but oriented 180° to each other on the same axis between the inlet 156 and the outlet 162. The inlet chamber of the dual safety relay valve 122 includes a first connection port 164 for supplying bleed gas via small bore piping 120 to the rotary damper actuator valve 114.

In one embodiment wherein the first and second main controlling valves 158, 212 operate together, a second connection port (not shown) for receiving bleed gas back from the rotary damper actuator valve 114 via the small bore piping 128 is located in the diaphragm control chambers between a first main diaphragm 166 and the cover 168 and between a second main diaphragm 216 and the cover 218. The communication of the bleed gas to both the first and the second main diaphragms 166, 216 to pressurize them and actuate the first and second main controlling valves 158, 212 may be through a flow passage within the housing of the dual safety relay valve 122, or may be provided by external piping. In either configuration, the actuation of both the first and the second main controlling valves 158, 212 will occur more or less at the same time as the pressure in each of the diaphragm control chambers will build approximately equally and assuming that the spring force from each of the first and second valve return springs 160, 214 are approximately equal.

In another embodiment wherein the first and second main controlling valves 158, 212 operate in sequence, the second connection port for receiving bleed gas back from the rotary damper actuator valve 114 via the small bore piping 128 is located in the diaphragm control chamber between a first main diaphragm 166 and the cover 168. A flow passage (not shown) then connects the second diaphragm control chamber between the second main diaphragm 216 and the cover 218 to a gas flow chamber located downstream of the valve seat 220 of the first main controlling valve 158. Once the bleed gas from the rotary damper actuator valve 114 has caused the first main diaphragm 166 to open the first main controlling valve, gas will flow into the gas flow chamber between the first and second main controlling valves 158, 212. A portion of this gas will then travel through the flow passage to the second diaphragm control chamber between the second main diaphragm 216 and the cover 218, causing the second main diaphragm 216 to expand and open the second main controlling valve 212. This will then allow the gas to flow to the outlet 162 as shown in FIG. 7.

As will now be apparent, for each of the first and second main controlling valves 158, 212, a diaphragm (166, 216) is positioned within the diaphragm control chamber and is operatively coupled to the main valve control shaft 172, 222. Displacement of the diaphragm 166, 216 based on pressure within the diaphragm control chamber will operate to open or allow the first and second main controlling valves 158, 212 to close under pressure of spring 160 as discussed above. The purpose of the dual safety relay valve 122 with its two anti-parallel positioned and serially connected main controlling valves 158, 212 is to enhance the safety of the appliance through having redundant valve control of the supply of gas to the main burner. The improved safety relies on the fact that it is unlikely that a possible faulty operation due a spring failure, diaphragm rip, dirt under the valve seat, etc. is likely to happen to both valves at the same time. Since they are in series then at least one valve will operate properly until the other one is serviced. The anti-parallel orientation provides an efficient compact design, and allows fitment under existing combination gas controller 130, such as e.g. a Robertshaw R110, R220 or SIT AC3 controller, for retrofit applications.

Figure 8:
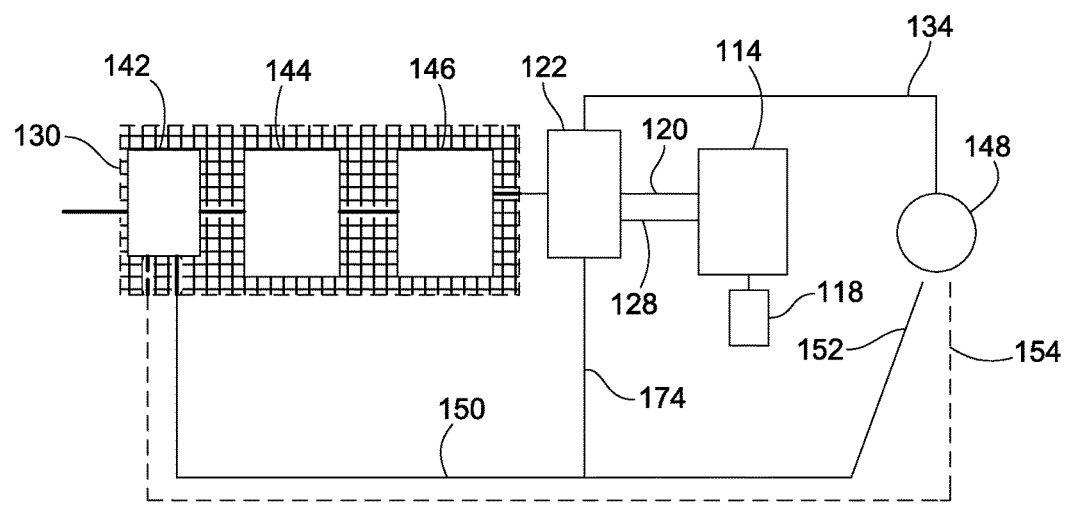
FIG. 8 is a block diagrammatic view of functional activity components of an embodiment of the gas control system of the present invention utilizing a pilot boost connection.
Figure 9:
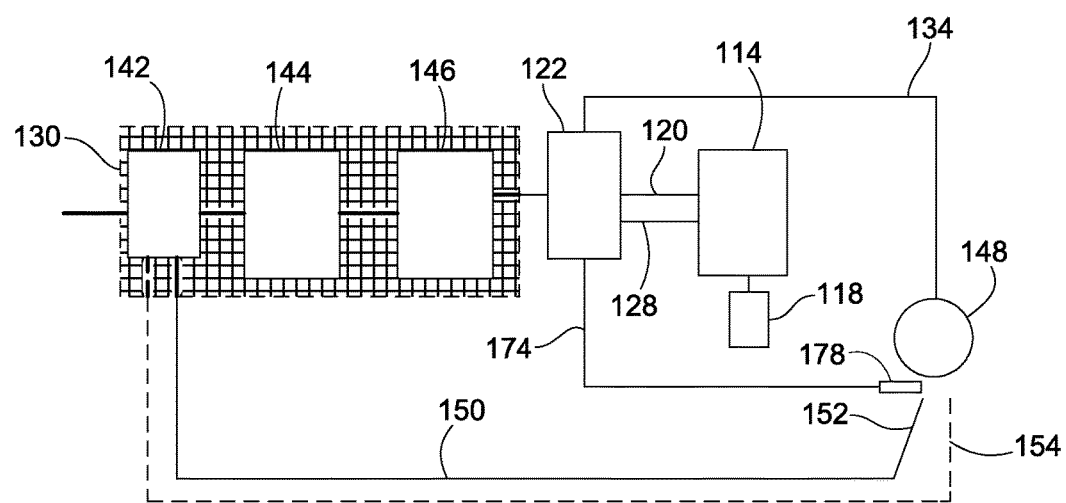
FIG. 9 is a block diagrammatic view of components of an embodiment of the gas control system of the present invention utilizing a booster pilot.

In an alternate embodiment, the dual safety relay valve 122 includes an optional booster pilot gas connection leading from the diaphragm control chamber for providing gas to a booster pilot, such as that described in co-pending application Ser. No. 12/175,504, entitled Micro-Pilot for Gas Appliance, filed Jul. 18, 2008, and assigned to the assignee of the instant invention, the teachings and disclosure of which are hereby incorporated in their entireties by reference thereto. As illustrated in FIG. 8, such a booster pilot gas connection 174 may be used to supply additional gas to the pilot feed pipe 150 to increase the pilot 152 flame just prior to opening of the main flow of gas to the burner 148 to aid in ignition thereof. In another embodiment as illustrated in FIG. 9, the booster pilot gas connection 174 could be coupled to a booster pilot 178 in addition to the pilot 152. In such an embodiment, the pilot 152 can be a micro pilot having a very small flame that is at least capable of igniting the gas flowing from the booster pilot gas connection 174 to the booster pilot 178, which is then used to ignite the main flow of gas to the burner 148.

Figure 10:
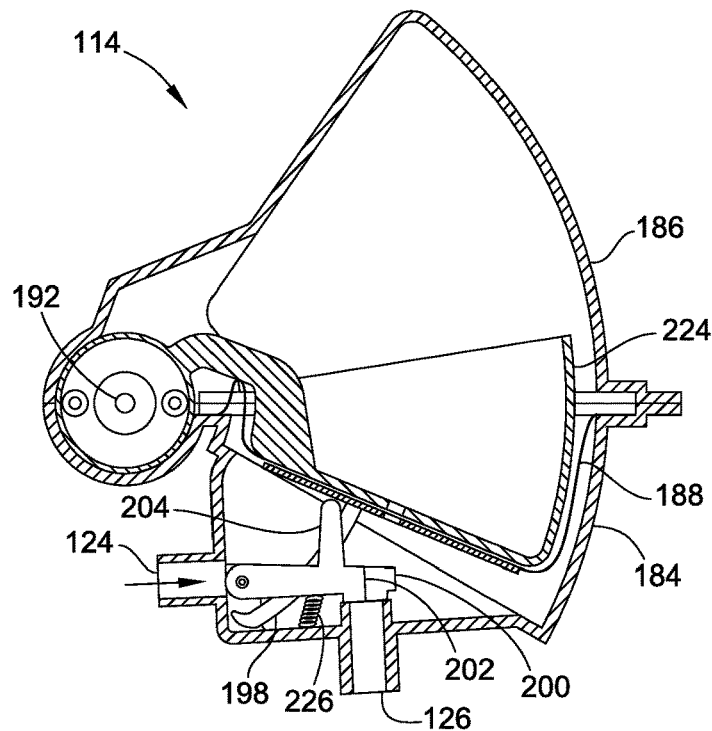
FIG. 10 is a cross-sectional side view illustration of an embodiment of a rotary damper actuator valve constructed in accordance with the teachings of the present invention in a closed position.

Turning now to FIG. 10, there is illustrated a simplified cross-sectional view of an embodiment of a rotary damper actuator valve 114 shown in a closed position. The rotary damper actuator valve 114 incorporates a gas inlet 124 formed in one half of the casing 184, a second half of the casing 186, a diaphragm 188, a rotatable shaft 192 in driven communication with a piston 224 coupled to the diaphragm 188, a safety valve connection hook 198, a damper actuator safety valve 200, a safety valve return spring 226, a bypass 202 in the damper actuator safety valve 200, and a outlet gas connection 126 to bleed gas back to the dual safety relay valve 122. The damper actuator safety valve bypass 202 is a small pilot hole, by way of example only approx. 0.50 mm diameter, to ensure all the gas drains from the rotary damper actuator valve 114 when the gas burner is turned off to allow the damper flapper valve 118 to tightly close thereafter, particularly when natural gas is used.

In an alternate embodiment, particularly well suited for use with LP gases, neither the safety valve return spring 226 nor the bypass 202 in the damper actuator safety valve 200 are used. Instead, a torsion spring (not shown) surrounding the rotating shaft 192 is used to return the damper actuator safety valve 200 to its closed position and a detent mechanism (not shown) similar to the detent mechanism 228 shown in FIG. 12. In such an embodiment, the safety valve connection hook 198 is so designed so that it does not engage the valve arm 204 until approximately 90% of travel so as to allow good combustion before dragging the damper actuator safety valve 200 off its seat. In doing so it also drags the valve arm 204 containing a small spigot (not shown) past the detent in the detent mechanism 228 (see FIG. 12) to the detent open position. Upon close down the spigot and detent mechanism is also so designed to keep the safety valve open until the top of the diaphragm keeper hits the top of the valve arm 204 and moves it to the detent closed position (on the other side of the detent from that shown in FIG. 12) and closes the safety valve after approximately 90% of gas is drained.

As indicated above, upon the thermostat calling for heat, gas is supplied to inlet of the closed dual safety relay valve 122. Gas is then supplied to the rotary damper actuator valve inlet 124 pressuring the diaphragm 188. The displacement of the diaphragm 188 rotates the piston 224, which rotates shaft 192. The shaft 192 either couples to or forms a portion of the crankshaft rod 190. As such, rotation of shaft 192 rotates crankshaft rod 190 to open the damper flapper valve 118 sufficiently for good combustion.

Figure 11:
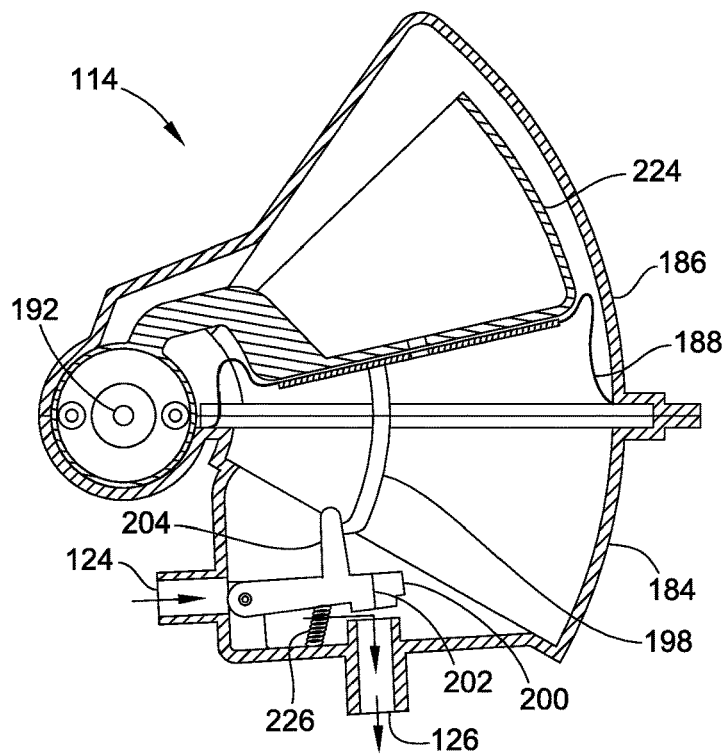
FIG. 11 is a cross-sectional side view illustration of the rotary damper actuator valve of FIG. 10 in an open position.

The continued pressurising and resulting further displacement of the diaphragm 188 and piston 224 finally causes the safety valve connection hook 198 to catch the valve arm 204 to drag the damper actuator safety valve 200 off its seat. This allows gas to be bled back to the dual safety relay valve 122 through outlet 126 as shown in FIG. 11.

This function of the gas safety valve 200 being finally dragged off its seat when the damper flapper valve 118 is opened sufficiently for good combustion may be defined by a damper actuator safety valve drag distance. This distance must be accurately controlled for safety and may be accomplished in many ways, e.g. the relative lengths of the safety valve connection hook 198 and the valve arm 204. That is, the valve arm 204 and safety valve connection hook 198 are sized relative to one another to ensure proper damper actuator safety valve drag distance.

Other embodiments may use a chain between the diaphragm 188 and piston 224 and the damper actuator safety valve 200 of a length to ensure that the chain is only taut, and therefore finally drags the damper actuator safety valve 200 off its seat once the damper actuator safety valve drag distance has been spanned. Other mechanisms may include a rod with stop, located inside a tube with a slot, or that shown in FIGS. 2 and 3 of U.S. Pat. No. 4,076,171.

Figure 12:
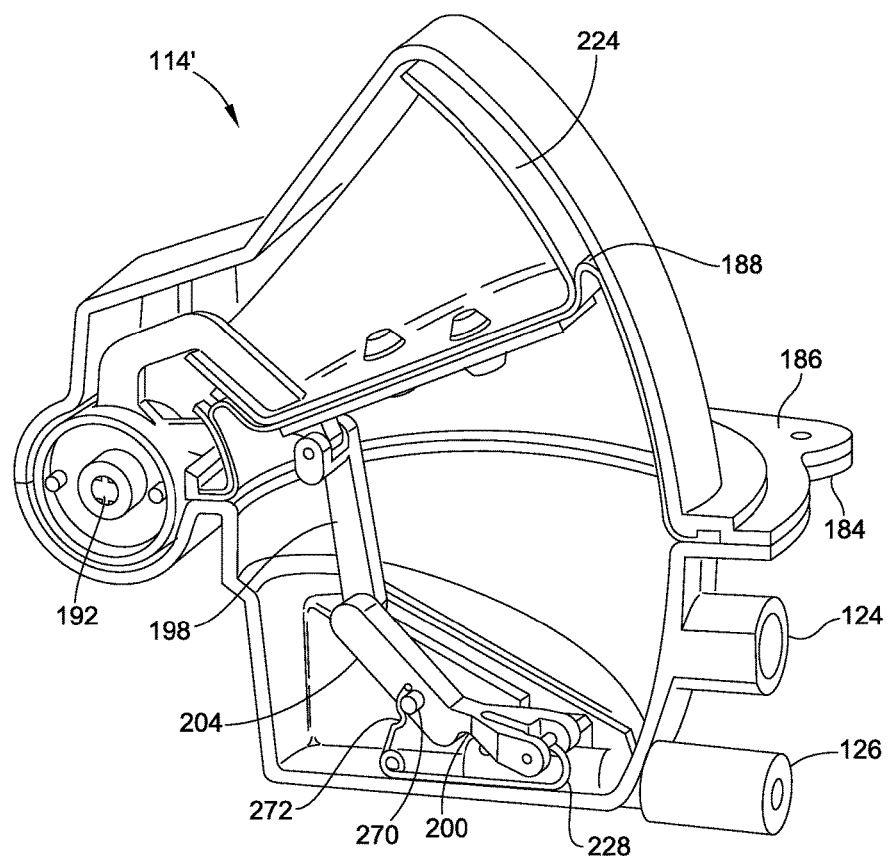
FIG. 12 is a cross-sectional side view illustration of an alternate embodiment of a rotary damper actuator valve constructed in accordance with the teachings of the present invention in an open position.

Another mechanism is illustrated in the alternate embodiment of the rotary damper actuator valve 114' illustrated in FIG. 12. In this embodiment, the safety valve connection hook 198 has a projection (not shown) that slides along a slot (not shown) in the valve arm 204 as the piston 224 rotates under the force of the expanding bellows 188. The length of the slot and the safety valve connection hook 198 then control the damper actuator safety valve drag distance. As discussed above, in such an embodiment the safety valve connection hook 198 is so designed so that it does not engage the valve arm 204 until approximately 90% of travel so as to allow good combustion before dragging the damper actuator safety valve 200 off its seat. In doing so it also drags the valve arm 204 containing a small spigot 270 past the detent 272 in the detent mechanism 228 to the detent open position shown. Upon close down the spigot 270 and detent 272 operate to keep the safety valve 200 open until the top of the diaphragm keeper hits the top of the valve arm 204 and moves it to the detent closed position with the spigot 270 on the other side of the detent 272 from that shown in FIG. 12 and closes the safety valve 202 after approximately 90% of gas is drained.

Regardless of the mechanism to control the damper actuator safety valve drag distance, once the thermostat no longer calls for heat and the supply of gas is stopped, the safety valve return spring 226 (or the torsion spring through the shaft 192 and operation of the detent mechanism 228) acts on the damper actuator safety valve 200 to close it and stop the pressurizing flow of gas from outlet 126 before the damper flapper valve 118 has closed. This will result, as will be discussed more fully below, in the closing of the dual safety relay valve 122 to turn off the burner of the appliance before the damper flapper valve 118 closes the flue.

Figure 13:
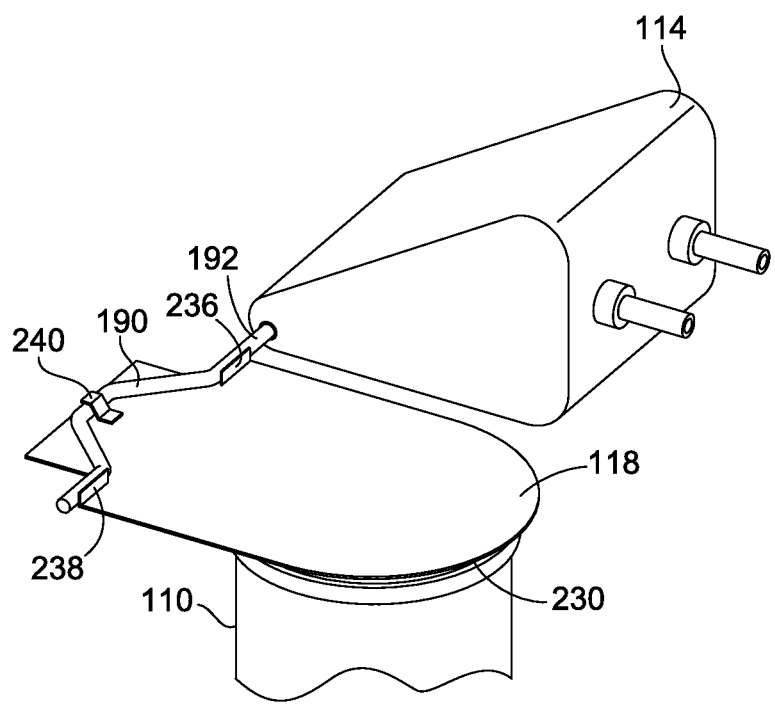
FIG. 13 is a simplified isometric view of an embodiment of a damper flapper valve constructed in accordance with the teachings of the present invention engaging a gas appliance flue pipe in a closed position.

The closing of the flue pipe 110 by the damper flapper valve 118 may take numerous forms in various embodiments of the present invention. In one embodiment illustrated in FIG. 13 in a closed position and in FIG. 14 in an open position, the damper flapper valve 118 and rotary damper actuator valve 114 are positioned proximate the flue pipe 110 for closing engagement with a top edge thereof. In a closed position as shown in FIG. 13, the damper flapper valve 118 is positioned over the top of the flue pipe 110 so as to close off any opening therebetween and reduce thermal siphoning. As may be seen from the open position illustrated in FIG. 14, to aid in the closure of the flue pipe 110, a valve seat 230 may be positioned on the top opening of the flue pipe 110 to ensure positive closure and increasing the effectiveness of the damper flapper valve 118.

While such an embodiment is effective, it is dependent on good tolerance matching between the horizontal position of the damper flapper valve 118 and the upper edge of the flue pipe 110. While such can be easily controlled when manufacturing the appliance, or may be compensated by inclusion of the valve seat 230, typically the tolerance stack up in such appliance manufacturing processes do not lend themselves to a tight fit.

Figure 15:
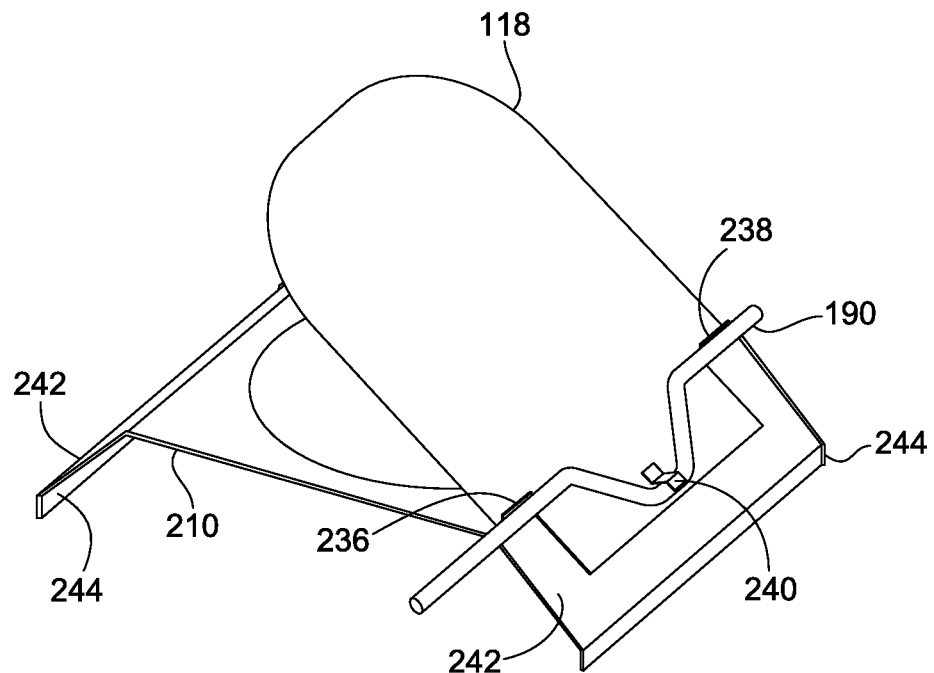
FIG. 15 is a simplified isometric view of an alternate embodiment of a damper flapper valve utilizing a valve seat bracket configured for fitment into a balanced flue terminal of an outdoor water heater constructed in accordance with the teachings of the present invention in an open position.
Figure 16:
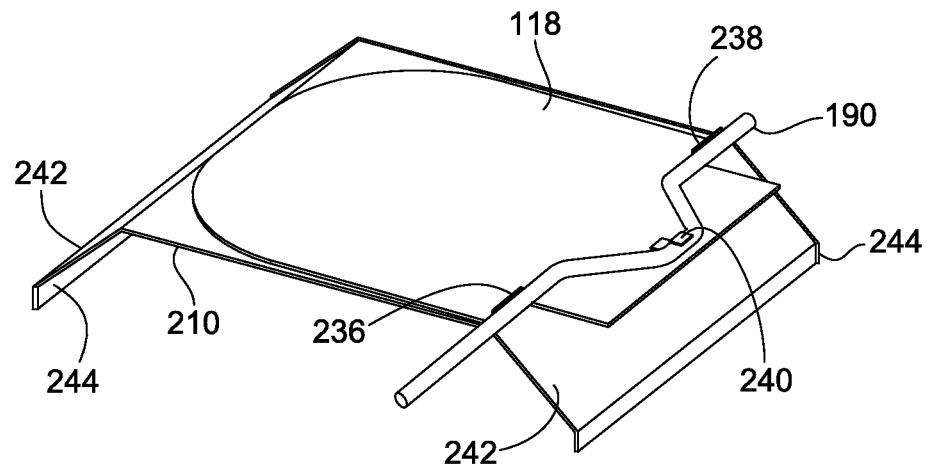
FIG. 16 is a simplified isometric view of the damper flapper valve utilizing a valve seat bracket configured for fitment into a balanced flue terminal of an outdoor water heater of FIG. 15 in a closed position.

As such, and in order to slip or overcome such tolerance issues, alternate embodiments, such as that shown in FIGS. 15-20 for use on appliances that have a square flue gas transfer duct transporting the hot flue gases to the front of the appliance, such as currently used in outdoor gas water heaters in Australia, are provided. In such an installation, a valve seat bracket 210 may be utilized (FIG. 15 illustrates an open position and FIG. 16 a closed position). The valve seat bracket 210 is configured to fit into the square transfer duct of the terminal 140 (see FIGS. 19 and 20) of the outdoor water heater.

The height of the valve seat bracket 210 takes into account the maximum design tolerance of component parts relative to the amount of height the flue pipe 110 will penetrate through the jacket top of the outdoor water heater to ensure that the top surface forming the false flapper valve seat is above the top of the flue pipe 110. The surrounding space at the top of the flue pipe may be insulated to further reduce heat losses. This height allows this embodiment to overcome the issue of tolerance stack up which may be as large as six to eight millimeters.

Figure 20:
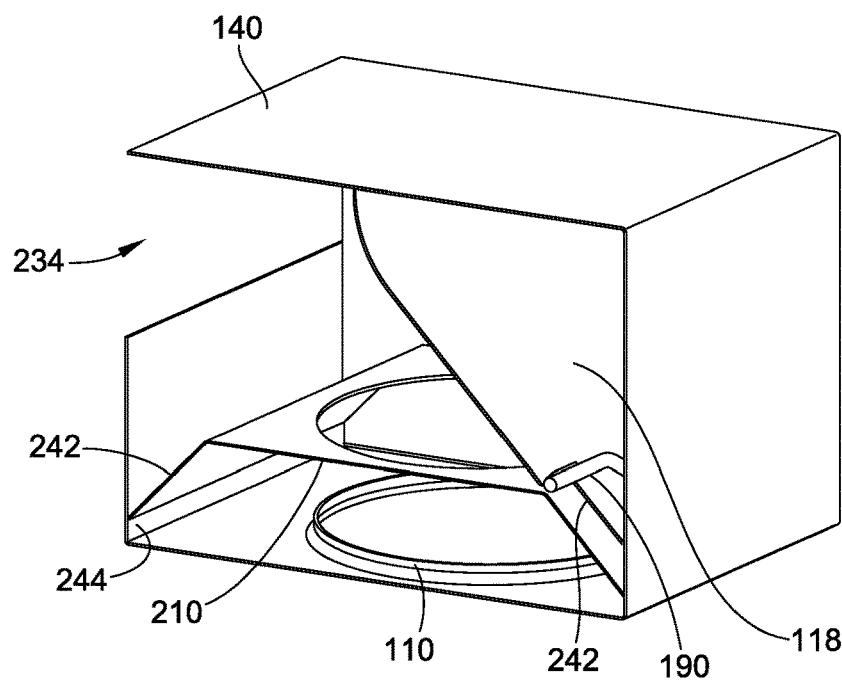
FIG. 20 is a simplified isometric view of the damper flapper valve of FIG. 15 illustrating fitment of the valve seat bracket into the balanced flue terminal of an outdoor water heater in an open position.

The damper flapper valve 118 utilizes the edge 232 (see FIG. 18) of the valve seat bracket 210 as a floating fulcrum point. In this way, the damper flapper valve 118 is simply allowed to lay on top of the valve seat bracket 210 in a closed position (see FIGS. 16 and 19). Because the valve seat bracket 210 is sized to fit inside the terminal 140, i.e. having edges that contact the side walls or otherwise minimize gaps therebetween, there is little to no heat loss through the transfer duct 234 of the terminal 140 while the damper flapper valve 118 is lying on top of the valve seat bracket 210. In other words, contact between the valve seat bracket 210 and the walls of terminal 140 ensures that the thermal siphoning is precluded therebetween. Only when the damper flapper valve 118 is in an open position, such as shown in FIG. 20, can the hot flue gases flow from the top of the flue pipe 110 through the opening in the valve seat bracket 210 and out through the transfer duct 234.

Figure 14:
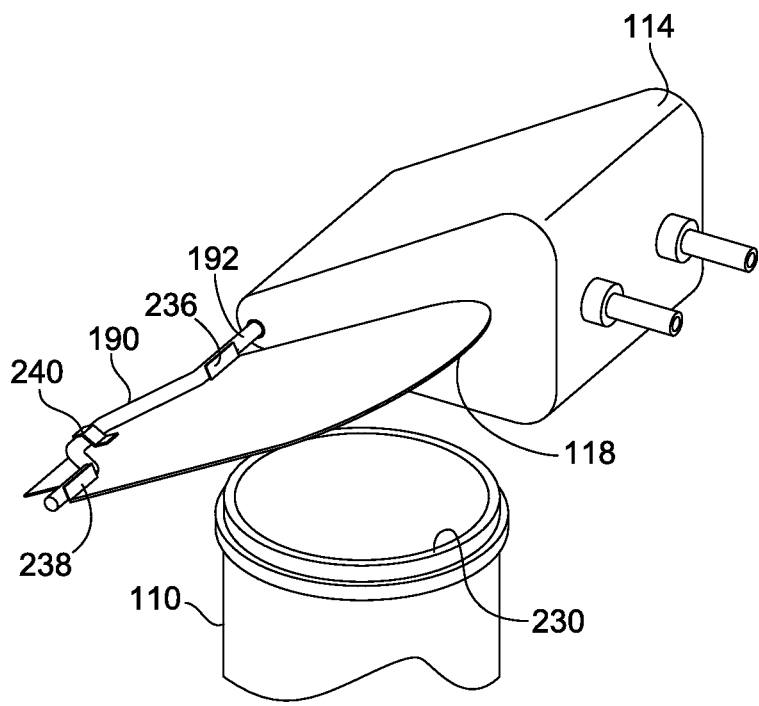
FIG. 14 is a simplified isometric view of the damper flapper valve of FIG. 13 engaging a gas appliance flue pipe in an open position.

The use of the valve seat bracket 210 fitted into the terminal 140 eliminates the necessity of ensuring that the damper flapper valve 118 can seal on the top of flue pipe 110 (such as is required in the embodiment illustrated in FIGS. 13 and 14). This eliminates the need to precisely control the positioning of the top of the flue pipe 110 so that it mates with the damper flapper valve 118 once it and the rotary damper actuator valve 114 are fitted onto the appliance.

Figure 17:
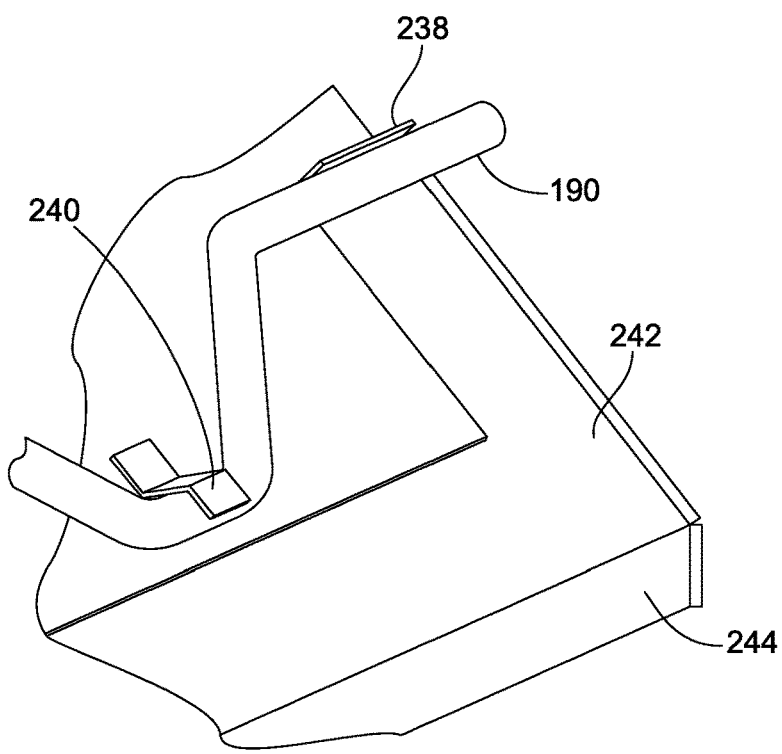
FIG. 17 is an enlarged partial view of the damper flapper valve utilizing a valve seat bracket configured for fitment into a balanced flue terminal of an outdoor water heater of FIG. 16 illustrating engagement with the crank shaft.
Figure 18:
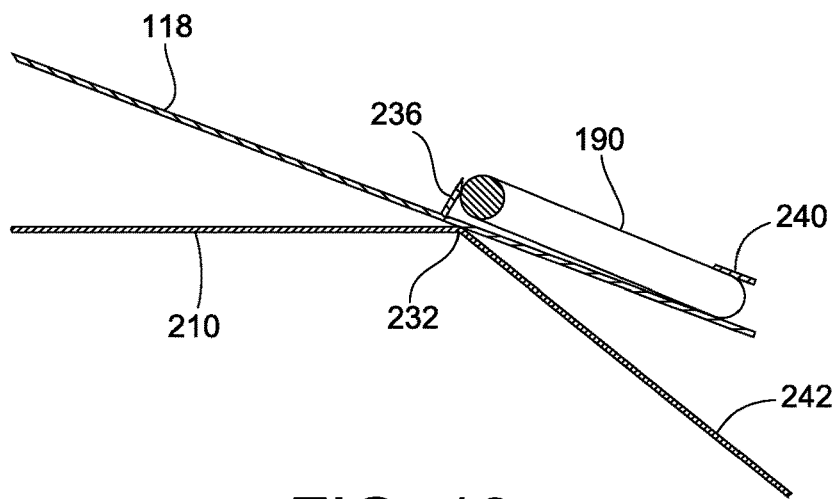
FIG. 18 is a side view illustration of FIG. 17 illustrating engagement between the damper flapper valve and the valve seat bracket.
Figure 19:
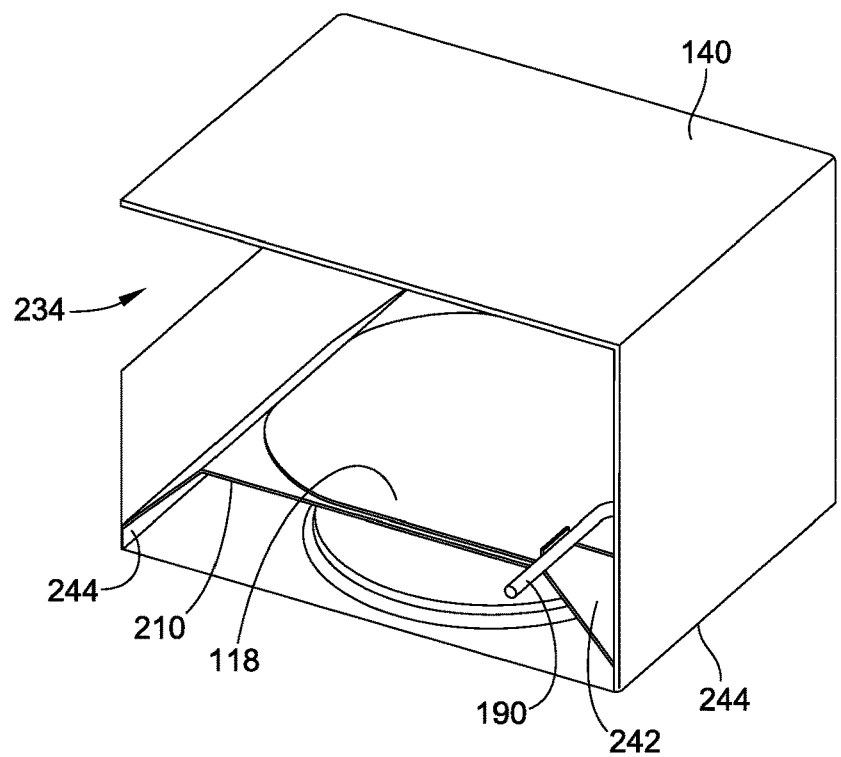
FIG. 19 is a simplified isometric view of the damper flapper valve of FIG. 15 illustrating fitment of the valve seat bracket into the balanced flue terminal of an outdoor water heater in a closed position.

As may be seen best from the enlarged partial view of FIG. 17, fold up tabs (236) 238 are formed on either side of the v-shaped bend in the crank shaft 190. A capture tab 240 is also formed to engage the crank shaft 190 in the center of the v-shape bend therein. In this way, the rotating crank shaft 190 has some freedom of rotation before affecting the position of the flapper valve relative to the valve seat due to the lose capture of the tabs. In such a configuration, the angle of opening of the damper flapper valve 118 is roughly limited by the angle of the positioning legs 242 of the valve seat bracket 210. The outdoor heater damper flapper valve will normally open approximately sixty degrees due to the internal square ducting of the appliance whereas the indoor heater's damper flapper valve normally opens a full ninety degrees. The opening of the actuator safety valve is adjusted accordingly with each heater to ensure good combustion. In the embodiment of the valve seat bracket 210 illustrated in FIGS. 15-20, a pair of downwardly depending walls 244 are included to aid the positioning and stability of the valve seat bracket 210 within the terminal 140. However, those skilled in the art will recognize that such are not required within the scope of the invention.

Figure 21:
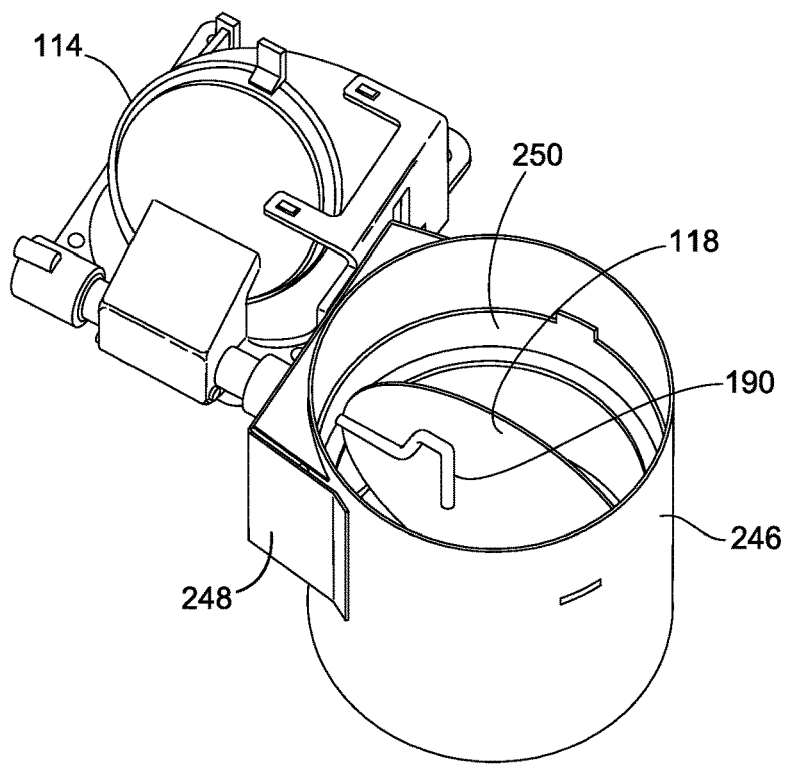
FIG. 21 is a simplified isometric view of an alternate embodiment of a damper flapper valve configured for fitment into the flue pipe of a gas burning appliance constructed in accordance with the teachings of the present invention.
Figure 22:
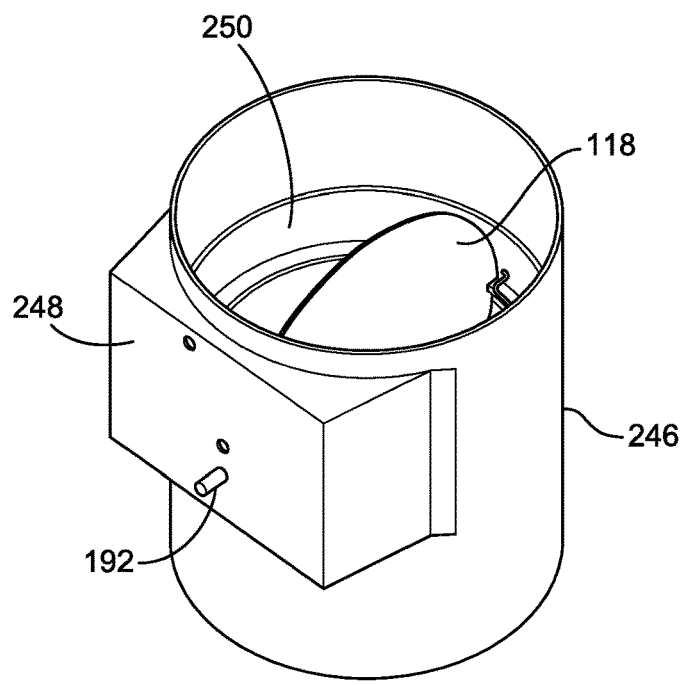
FIG. 22 is an alternate view of a simplified isometric illustration of the damper flapper valve of FIG. 21.

In an alternate embodiment of the present invention illustrated in FIG. 21, the damper flapper valve 118 is contained in a damper flapper valve housing 246 that is configured to fit over the water heater's primary flue pipe 110 to also slip the tolerance issue discussed above, particularly in retrofit applications. As will be recognized by those skilled in the art from the previous discussions, the damper flapper valve housing 246 may be the flue pipe 110 itself such as illustrated in FIG. 1, particularly for OEM installations of the damper flapper valve 118. Returning to the embodiment illustrated in FIG. 21, the damper flapper valve housing 246 includes a mounting adapter housing 248 for mounting the rotary damper actuator valve 114 thereon, and as illustrated in FIG. 22, for receiving the shaft 192 therethrough. The height of the damper flapper valve housing 246 may be such to allow it to engage the draft diverter 112 (see FIG. 1), or may be limited to provide a gap therebetween.

Figure 23:
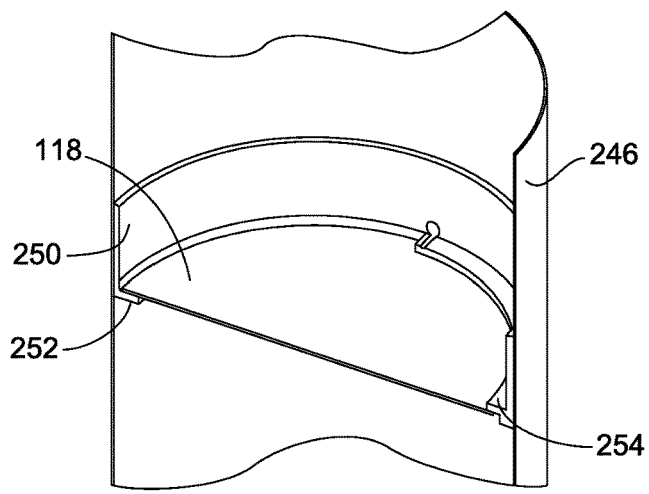
FIG. 23 is a partial cross-sectional isometric view of the damper flapper valve of FIG. 21 illustrating features of the valve seat collar positioned within the flue pipe of the gas burning appliance.
Figure 24:
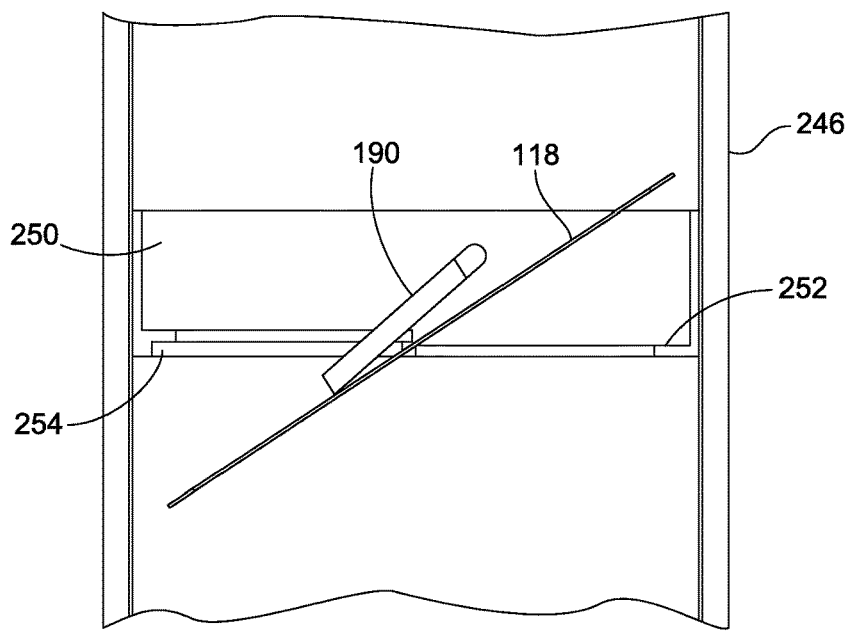
FIG. 24 is a side view illustration of the cross-sectional isometric view of the damper flapper valve of FIG. 23 illustrating opening of the damper flapper valve.
Figure 25:
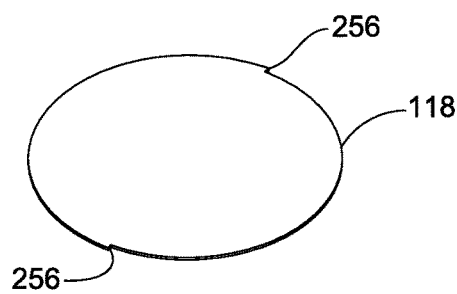
FIG. 25 is an isometric illustration of the flapper disc used in the damper flapper valve of FIG. 21.

Within the damper flapper valve housing 246 is contained a valve seat ring 250. This valve seat ring 250 has an upper valve seat surface 252 and a lower valve seat surface 254 as may be best seen from the partial cutaway illustrations of FIGS. 23 and 24. As illustrated in FIG. 25, the damper flapper valve 118 includes a pair of radius transition tabs 256 separating a larger and smaller radius portion of the damper flapper valve 118. This allows one portion of the damper flapper valve 118 to contact the upper valve seat surface 252 while the other portion contacts the lower valve seat surface 254 as illustrated in FIG. 23 in a closed position and in FIG. 24 in an open position.

In a preferred embodiment, the position of the radius transition tabs 256 are positioned to allow the damper flapper valve 118 to be over center weighted. This allows the damper flapper valve 118 to close due to gravity when assembled on the valve seat ring 250 when no other force is available. Advantageously, this design of the damper flapper valve 118 also allows for natural explosion relief due to the greater surface area relative to the central axis at its fulcrum point. In other words, the damper flapper valve 118 is freely able to open due to upward air pressure caused by rough or explosive ignition of fuel in the burner. This over center design allows the air pressure in the flue pipe to create a greater force on one side of the damper flapper valve 118 to momentarily open it, due to a larger surface area on that side of the damper flapper valve 118, relative to its fulcrum. Once the pressure transient has subsided, the over center weighted design of the damper flapper valve 118 will allow the damper flapper valve 118 to again close or return to its commanded position relative to the valve seat ring 250. This may be aided by deliberately weighting one side of the damper flapper valve 118.

Figure 26:
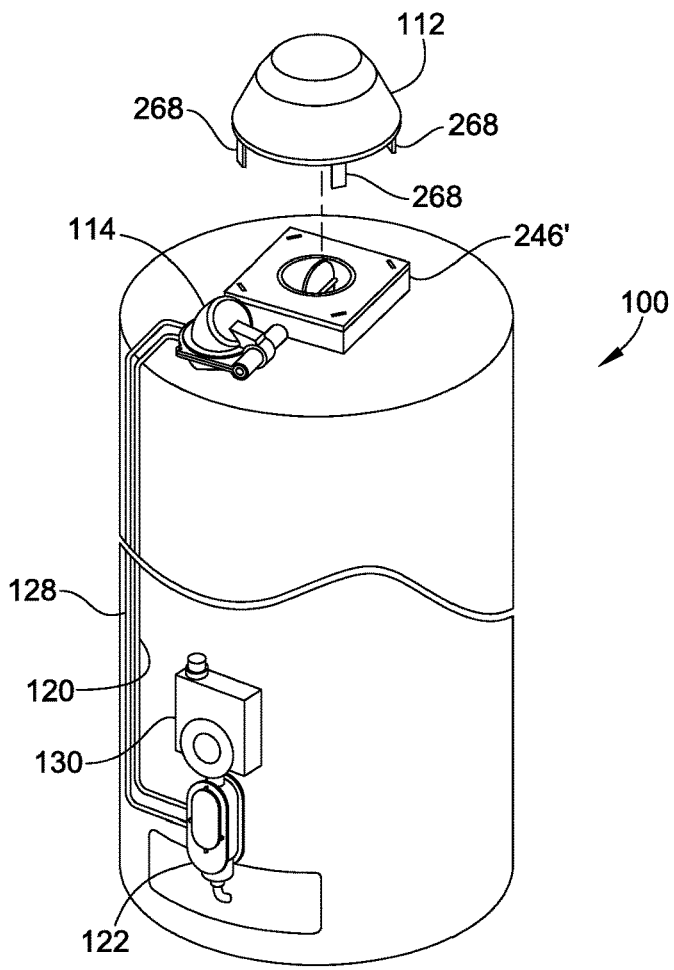
FIG. 26 is an isometric illustration of an alternative embodiment of a damper flapper valve utilizing a housing configured for fitment onto the flue pipe of a gas burning appliance constructed in accordance with the teachings of the present invention.
Figure 27:
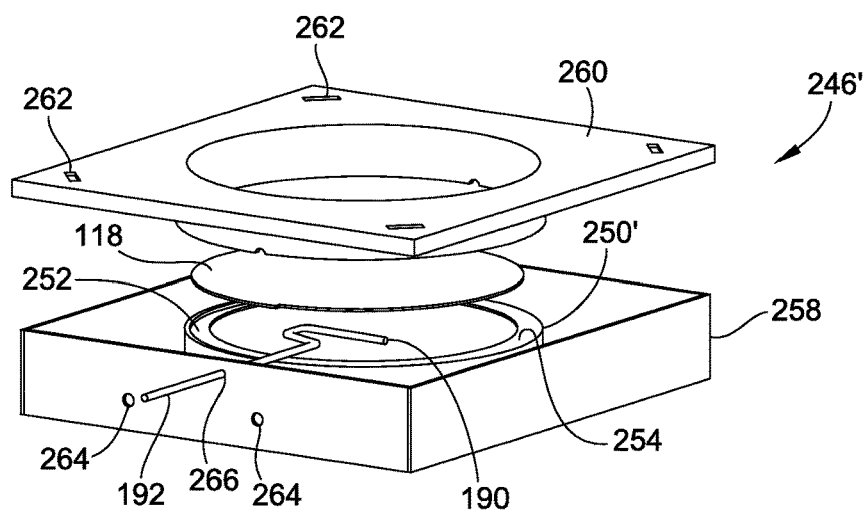
FIG. 27 is an exploded isometric illustration of the damper flapper valve and housing of FIG. 26.
Figure 28:
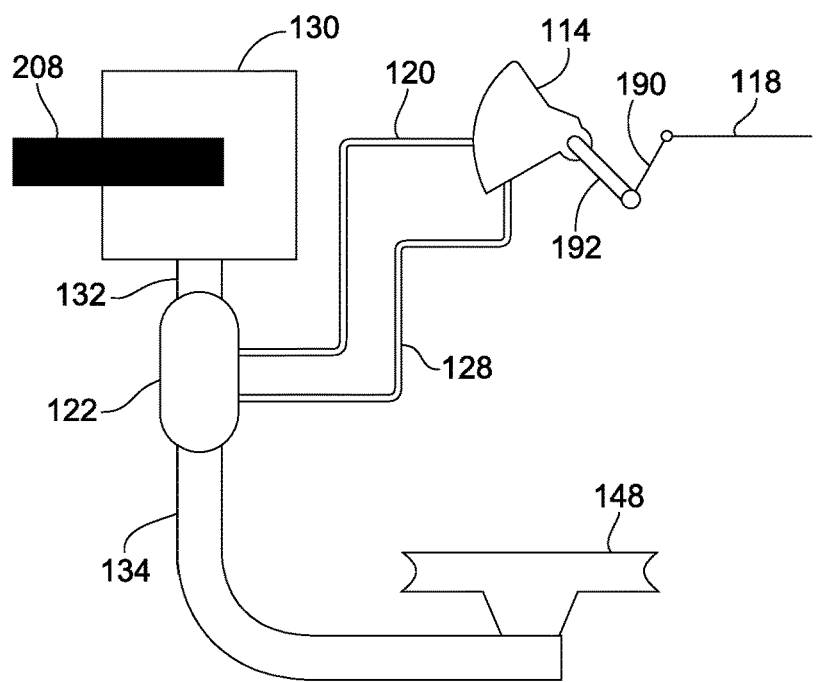
FIGS. 28-32 are schematic gas flow diagrams illustrating sequential gas flow and damper control provided by one embodiment of the standby heat loss control system of the present invention.

In an alternate embodiment of the present invention as illustrated in FIGS. 26 and 27, the damper flapper valve housing 246' is constructed from a two piece construction designed to integrate to existing designed water heaters 100. Such a configuration may be fitted in the factory or retrofitted to an existing product installed in a home or business. The base 258 of the damper flapper valve housing 246' is preferably constructed from sheet metal, and includes a press metal extrusion forming the valve seat ring 250'. This valve seat ring 250' is sized to fit over the primary flue pipe protruding through the jacket of the water heater 100. One of the sides of the base 258 includes mounting holes 264 for mounting the rotary damper actuator valve 114, as well as a hole 266 to accommodate shaft 192 that couples to the rotating damper actuator valve 114.

The top 260 of the damper flapper valve housing 246' is also preferably constructed from sheet metal, and includes an extrusion downward to fit over the base valve seat ring 250' extrusion to form a continuous passageway through the damper flapper valve housing 246'. The top 260 also includes slots 262 to engage the legs 268 of the existing draft diverter 112 illustrated in FIG. 26. When this top 260 is fit onto the bottom 258 the damper flapper valve housing 246' forms a sheet metal box that supports and locates the existing draft diverter and is strong enough to support the secondary flue pipe of the installation leading out of the dwelling.

It should be noted that while the damper flapper valve housing 246' illustrated in FIGS. 26 and 27 is a rectangular configuration, the outer periphery may take on other configurations, for example, round. In such a configuration, a mounting adaptor housing 248 such as that illustrated in FIGS. 21 and 22 may be utilized for mounting of the rotary damper actuator valve 114 thereon. Alternatively, the mounting bracket for the rotary damper actuator valve 114 may be configured to mount to such a curved damper flapper valve housing 246' configuration.

With a thorough understanding of various embodiments of the components of the standby energy loss prevention system 102 of the present invention, attention will now be turned to FIGS. 28-32, which illustrate the gas flow through the system at each stage of operation. The presence of gas is illustrated in these figures as a darkened area in the piping and/or components. For example, in FIG. 28, gas is present in gas supply pipe 208 at the inlet to the combination gas controller 130, such as e.g. a Robertshaw R110, R220 or SIT AC3 controller. However, since in this figure the combination gas controller 130 has not initiated a call for heat, there is no gas in the outlet gas feed pipe 132 leading to the dual safety relay valve 122.

Figure 29:
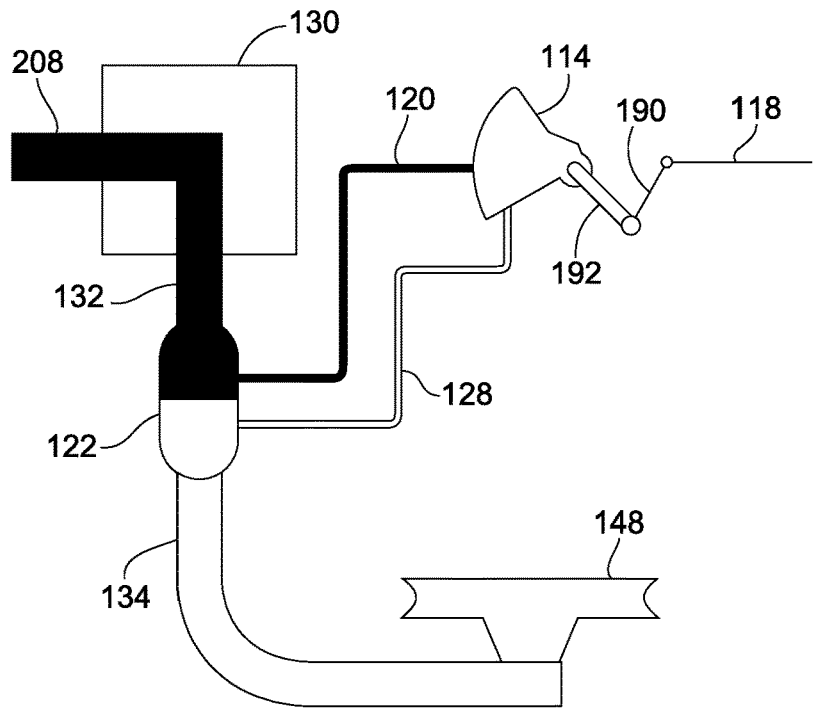

As illustrated in FIG. 29, when the thermostat in combination gas controller 130 calls for heat, the internal gas valve opens allowing gas to flow through the combination gas controller 130 and the outlet gas feed pipe 132 to the inlet of the closed dual safety relay valve 122. A bypass flow of gas is piped from the inlet of the dual safety relay valve 122 though the micro bore piping 120 to the rotary damper actuator valve 114. The size of the micro bore piping 120 may vary somewhat, and is preferable in the range of about 3 mm to 5 mm aluminium tube for typical hot water heater installations.

Figure 30:
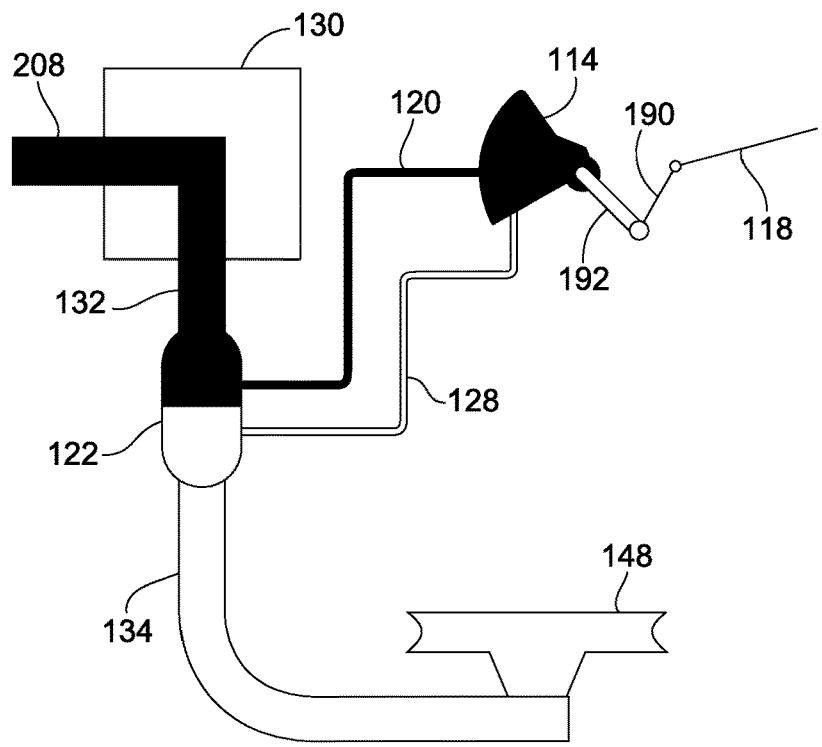

The rotary damper actuator valve 114 is pressurised as shown in FIG. 30, which rotates the shaft 192. The rotary movement of shaft 192 rotates the crank shaft 190, thereby opening the damper flapper valve 118. Continued movement of the piston 224 (see FIGS. 10-12) in the rotary damper actuator valve 114 will eventually drag the damper actuator safety valve 200 off its seat. As discussed above, the design is such that gas will not issue through the damper actuator safety valve 200 until the damper flapper valve 118 is sufficiently open for good combustion.

Figure 31:
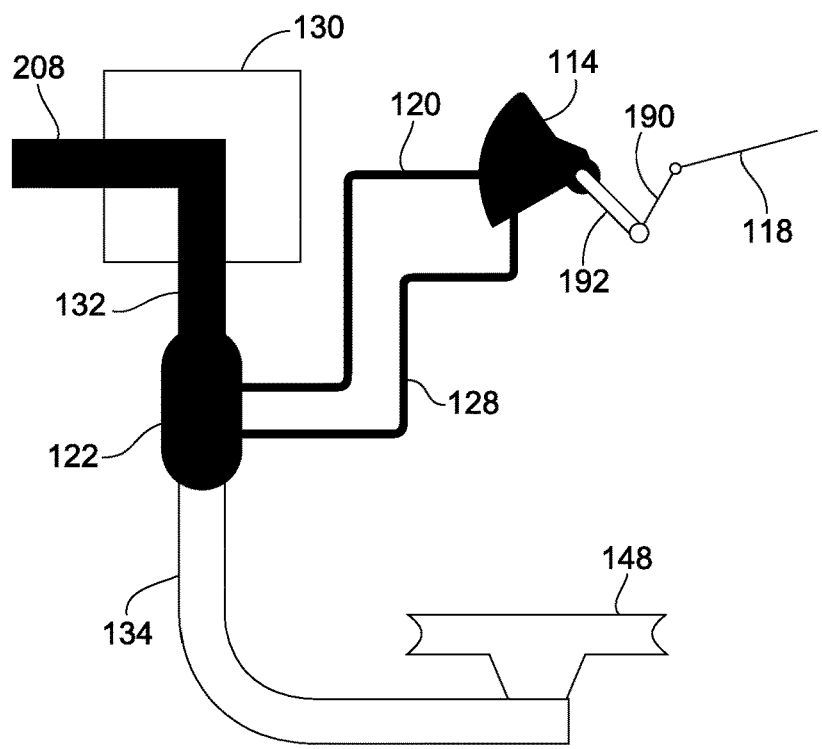

As illustrated in FIG. 31, the opened damper actuator safety valve allows the gas to bleed from the rotary damper actuator valve 114, through micro bore piping 128 back down to the dual safety relay valve 122. In embodiments that include a booster pilot, the flow from the rotary damper actuator valve 114 is at a faster rate than issues from the booster pilot outlet, thus pressurising the dual safety relay valve 122 diaphragm. The bleed gas starts to pressurize the relay diaphragm and is also bled to the booster pilot which ignites from the micro-pilot in such embodiments that includes a booster pilot (see FIG. 9), or increases the gas flow to the pilot in embodiments that include this feature (see FIG. 8).

Figure 32:
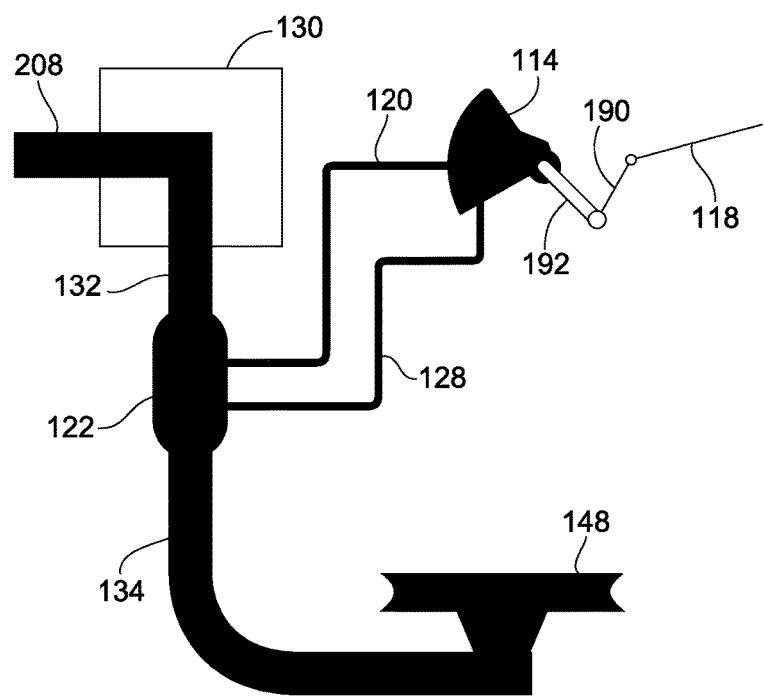

As illustrated in FIG. 32, once the dual safety relay valve 122 is finally pressurized, both of its main gas valves are forced open against the gas pressure and return spring force. Gas then issues to the main burner 148 via the burner feed pipe 134, where it is ignited by the pilot or booster pilot. In embodiments such as shown in FIGS. 8 and 9, gas continues to bleed from the dual safety relay valve 122 continues to be burnt in the combustion chamber when the main burner 148 is on.

Once the combination gas controller 130 determines that the water temperature has reached its set point temperature, it turns off all gas to the dual safety relay valve 122. Gas drains out of the damper of the rotary damper actuator valve 114 where upon the safety valve return spring closes the damper actuator safety valve 200 as the shaft 192 begins to rotate under decreasing pressure on the piston 224, rotating the crankshaft 190 which begins to close the damper flapper valve 118. Gas continues to drain from the damper actuator safety valve bypass 202 and from the diaphragm chambers of the dual safety relay valve 122, which allows the return springs 160, 214 to close off both of the main gas valves 158, 212 thus stopping all gas to the burner. The burner main flame is extinguished as well as the booster pilot leaving only the pilot or micro-pilot on.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dual safety relay valve, comprising: a housing having an inlet for receiving gas and an outlet for discharging gas received at the inlet; a first and a second main controlling valves positioned in series between the inlet and outlet but oriented anti-parallel to one another to control a flow of gas from the inlet to the outlet, the first and the second main controlling valves each including a valve control shaft drivably coupled to a diaphragm positioned in a diaphragm control chamber, wherein each of the valve control shafts is driven by movement of its respective diaphragm, wherein the housing further defines a booster pilot gas connection outlet in fluid communication with at least one diaphragm control chamber, and including a micro pilot supplied with gas by a pilot feed pipe, further comprising a booster pilot positioned in proximity to the micro pilot and the burner and in fluid communication with the booster pilot gas connection.

2. A dual safety relay valve, comprising: a housing having an inlet for receiving gas and an outlet for discharging gas received at the inlet; a first and a second main controlling valves positioned in series between the inlet and outlet but oriented anti-parallel to one another to control a flow of gas from the inlet to the outlet, the first and the second main controlling valves each including a valve control shaft drivably coupled to a diaphragm positioned in a diaphragm control chamber, wherein each of the valve control shafts is driven by movement of its respective diaphragm, wherein the housing further defines a first connection port in fluid communication with the inlet and a second connection port in fluid communication with at least one of the diaphragm control chambers, wherein each of the diaphragm control chambers are in fluid communication with the second connection port such that an opening of the first and the second main controlling valves occurs at approximately the same time.

* * * * *